April 5, 1927. R. H. LAWSON Re. 16,584

REVERSE PLATING BY ACTION OF CASTING-OFF MECHANISM

Original Filed Aug. 6, 1925 15 Sheets-Sheet 1

Inventor:
Robert H. Lawson,
by Emery, Booth, Janney & Varney
Attys.

REVERSE PLATING BY ACTION OF CASTING-OFF MECHANISM

Original Filed Aug. 6, 1925 15 Sheets-Sheet 2

Inventor:
Robert H. Lawson.
by Emery, Booth, Janney + Varney
Attys

April 5, 1927. R. H. LAWSON Re. 16,584

REVERSE PLATING BY ACTION OF CASTING OFF MECHANISM

Original Filed Aug. 6, 1925 15 Sheets Sheet 3

Inventor:
Robert H. Lawson,
by Emery, Booth, Janney & Varney
Attys

REVERSE PLATING BY ACTION OF CASTING-OFF MECHANISM

Original Filed Aug. 6, 1925 15 Sheets-Sheet 4

Inventor:
Robert H. Lawson,
by Emery, Booth, Janney & Varney
Attys.

April 5, 1927. R. H. LAWSON Re. 16,584

REVERSE PLATING BY ACTION OF CASTING-OFF MECHANISM

Original Filed Aug. 6, 1925 15 Sheets-Sheet 5

Inventor:
Robert H. Lawson,
by Emery, Booth, Janney + Varney
Attys

April 5, 1927. R. H. LAWSON Re. 16,584

REVERSE PLATING BY ACTION OF CASTING-OFF MECHANISM

Original Filed Aug. 6, 1925 15 Sheets-Sheet 6

Inventor:
Robert H. Lawson,
by Emery, Booth, Janney & Varney
Attys

REVERSE PLATING BY ACTION OF CASTING-OFF MECHANISM

Original Filed Aug. 6, 1925 15 Sheets-Sheet 7

Inventor:
Robert H. Lawson,
by Emery, Booth, Janney & Varney
Attys.

REVERSE PLATING BY ACTION OF CASTING-OFF MECHANISM

Original Filed Aug. 6, 1925 15 Sheets-Sheet 8

Inventor:
Robert H. Lawson,
by Emery, Booth, Janney & Varney
Attys

April 5, 1927. R. H. LAWSON Re. 16,584

REVERSE PLATING BY ACTION OF CASTING-OFF MECHANISM

Original Filed Aug. 6, 1925 15 Sheets-Sheet 9

Inventor:
Robert H. Lawson,
by Emery, Booth, Janney & Varney
Attys

April 5, 1927. R. H. LAWSON Re. 16,584

REVERSE PLATING BY ACTION OF CASTING-OFF MECHANISM

Original Filed Aug. 6, 1925 15 Sheets-Sheet 10

Inventor:
Robert H. Lawson.
by Emery, Booth, Janney + Varney
Attys

Inventor:
Robert H. Lawson,
by Emery, Booth, Janney & Varney
Attys.

April 5, 1927. R. H. LAWSON Re. 16,584

REVERSE PLATING BY ACTION OF CASTING-OFF MECHANISM

Original Filed Aug. 6, 1925 15 Sheets-Sheet 12

Inventor:
Robert H. Lawson,
by Emery, Booth, Janney & Varney
Attys

April 5, 1927. R. H. LAWSON Re. 16,584

REVERSE PLATING BY ACTION OF CASTING-OFF MECHANISM

Original Filed Aug. 6, 1925 15 Sheets-Sheet 13

Inventor:
Robert H. Lawson.
by Emery, Booth, Janney & Varney
Attys

April 5, 1927. R. H. LAWSON Re. 16,584
REVERSE PLATING BY ACTION OF CASTING-OFF MECHANISM
Original Filed Aug. 6, 1925 15 Sheets-Sheet 14
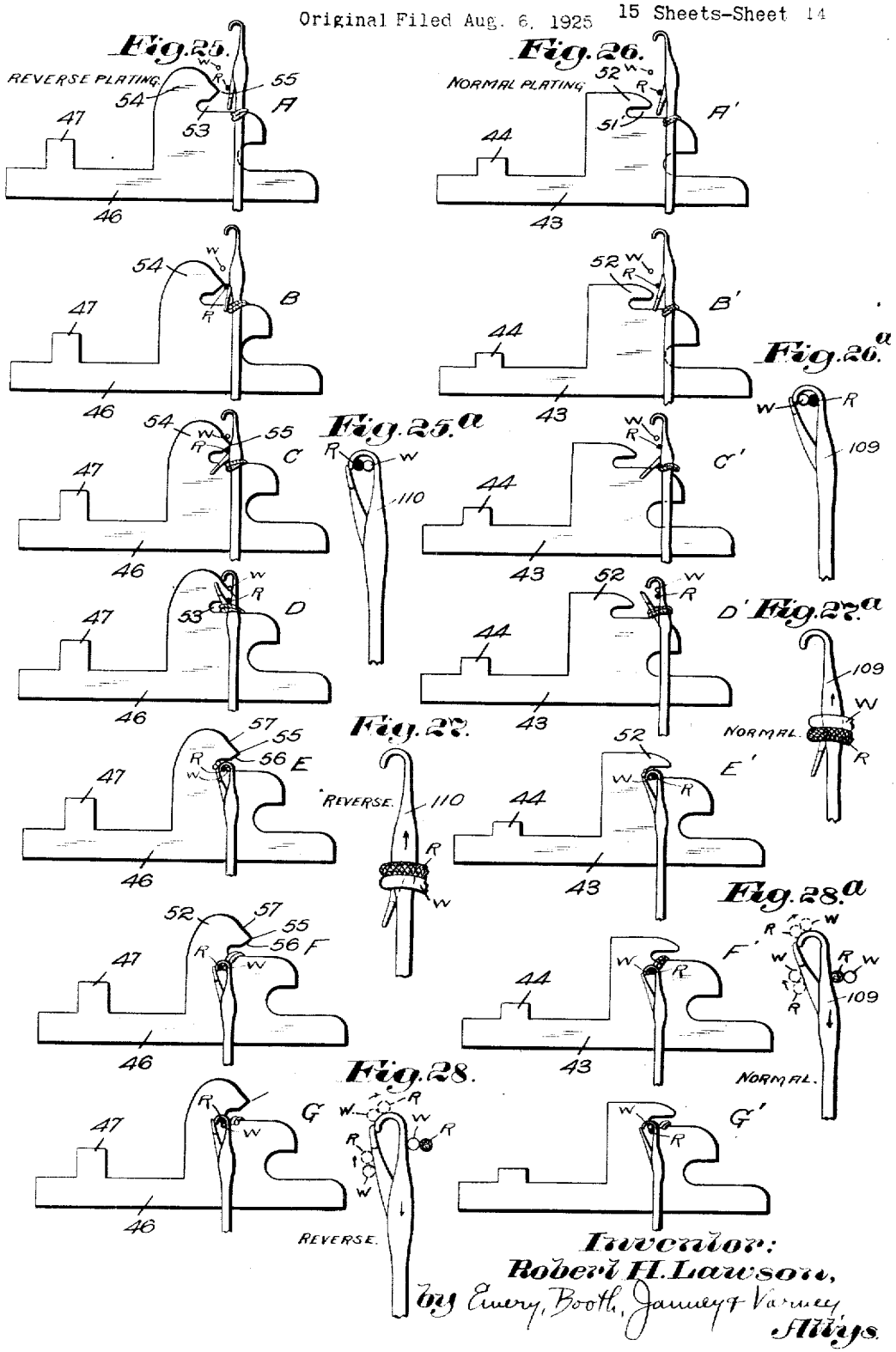
Inventor:
Robert H. Lawson,
by Emery, Booth, Janney & Varney
Attys.

April 5, 1927. R. H. LAWSON Re. 16,584

REVERSE PLATING BY ACTION OF CASTING-OFF MECHANISM

Original Filed Aug. 6, 1925 15 Sheets-Sheet 15

Inventor:
Robert H. Lawson.
by Emery, Booth, Janney & Varney
Attys.

Reissued Apr. 5, 1927. Re. 16,584

UNITED STATES PATENT OFFICE.

ROBERT H. LAWSON, OF PAWTUCKET, RHODE ISLAND, ASSIGNOR TO HEMPHILL COMPANY, OF CENTRAL FALLS, RHODE ISLAND, A CORPORATION OF MASSACHUSETTS.

REVERSE PLATING BY ACTION OF CASTING OFF MECHANISM.

Original No. 1,605,895, dated November 2, 1926, Serial No. 48,546, filed August 6, 1925. Application for reissue filed January 28, 1927. Serial No. 164,336.

This invention relates to reverse plating by the action of casting off mechanism and includes not only the novel mechanism one type of which will be disclosed, but also a novel process and fabric as well as novel instrumentalities herein disclosed as web holders.

In order that the principle of the invention may be readily understood, I have disclosed a single embodiment of the mechanism, the fabric and the instrumentalities, and will describe the best way known to me for carrying out the process or method of my invention.

Figure 1:
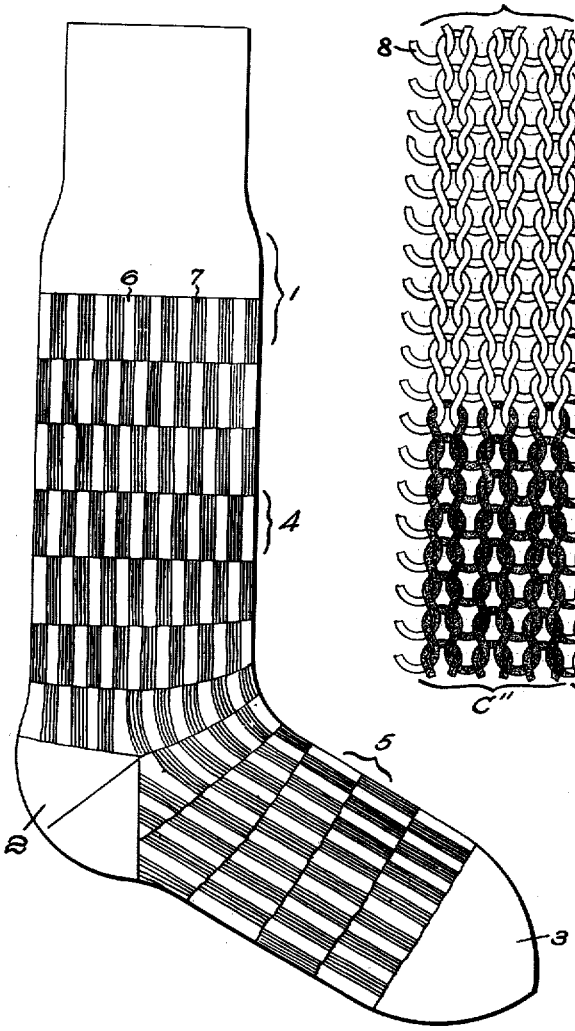
Fig. 1 is a side elevation of a hose or stocking constructed in accordance with my invention, the vertical stripes being short or interrupted.
Figure 3:
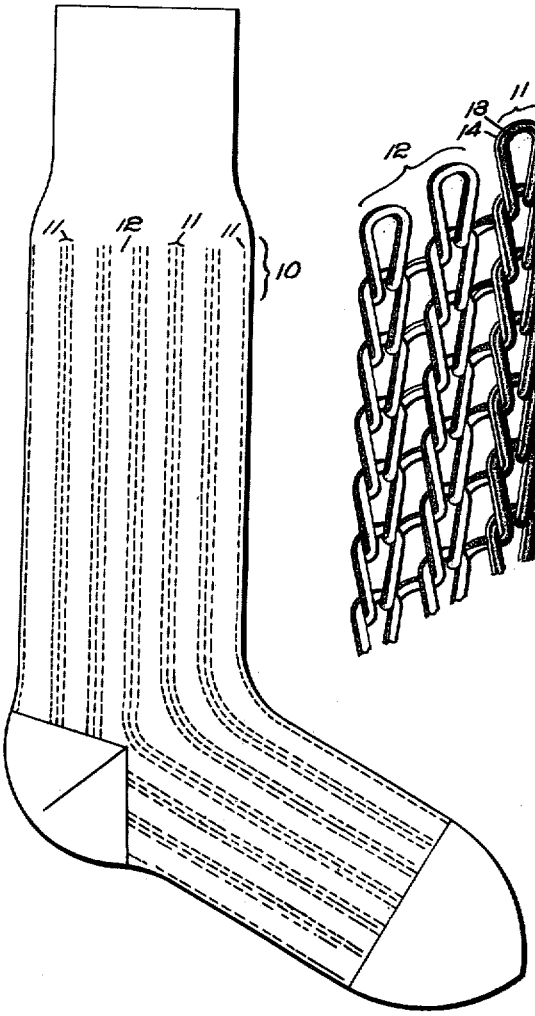
Fig. 3 is a view similar to Fig. 1, but representing the vertical stripes as continuous throughout the leg and foot of the hose or stocking.
Figure 4:
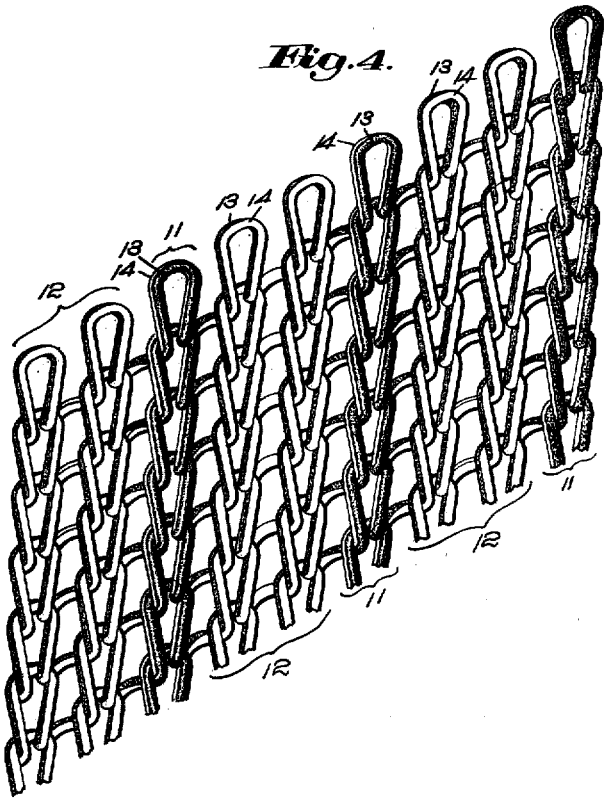
Fig. 4 is a perspective view of a portion only of the fabric of Fig. 3 and upon an enlarged scale to show the manner in which the vertical stripes are formed.
Figure 6:
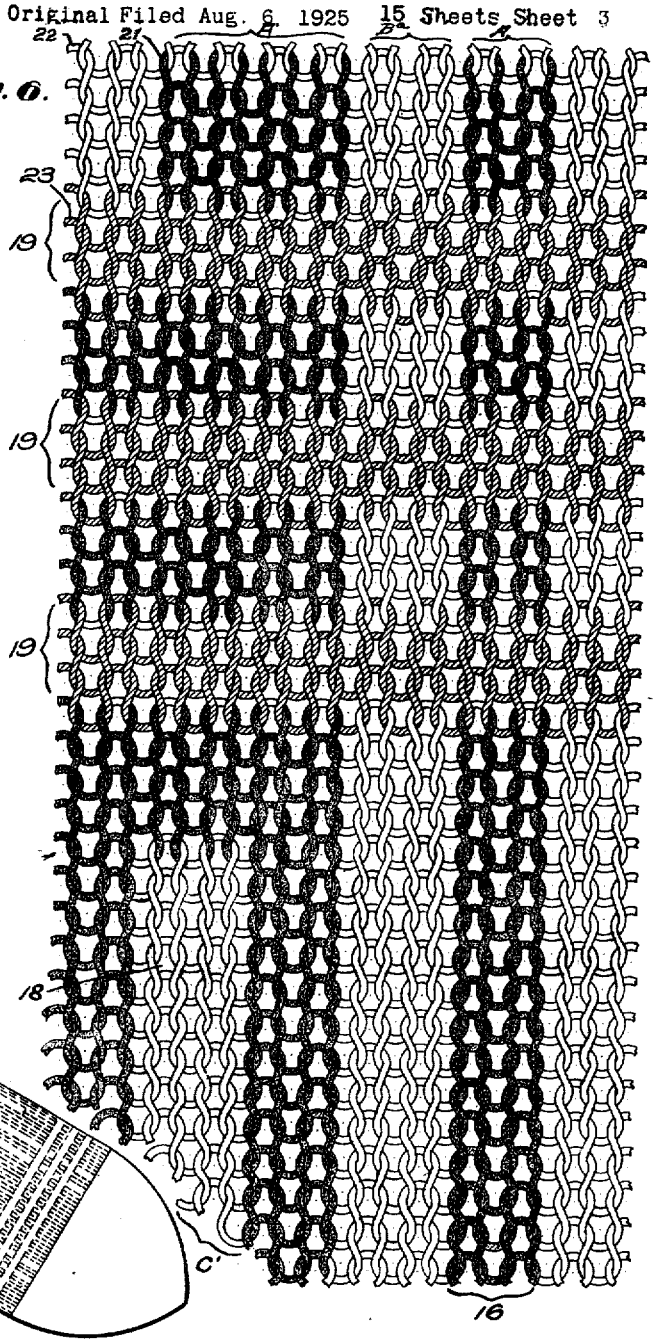
Fig. 6 is a view similar to Fig. 2, but of the structure shown in Fig. 5.
Figure 5:
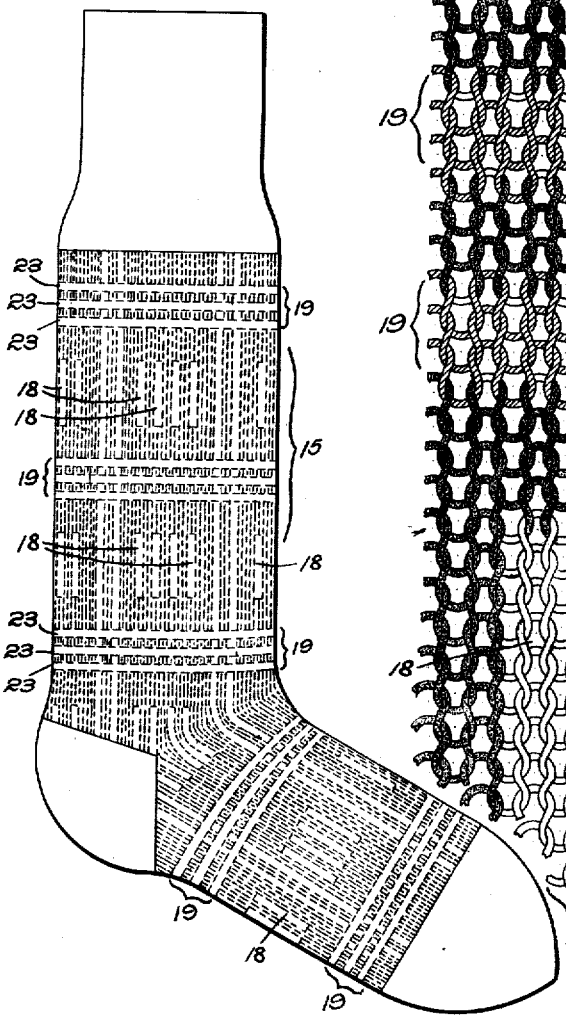
Fig. 5 is a view similar to Fig. 3, but representing both continuous and interrupted vertical stripes and also horizontal stripes.
Figure 7:
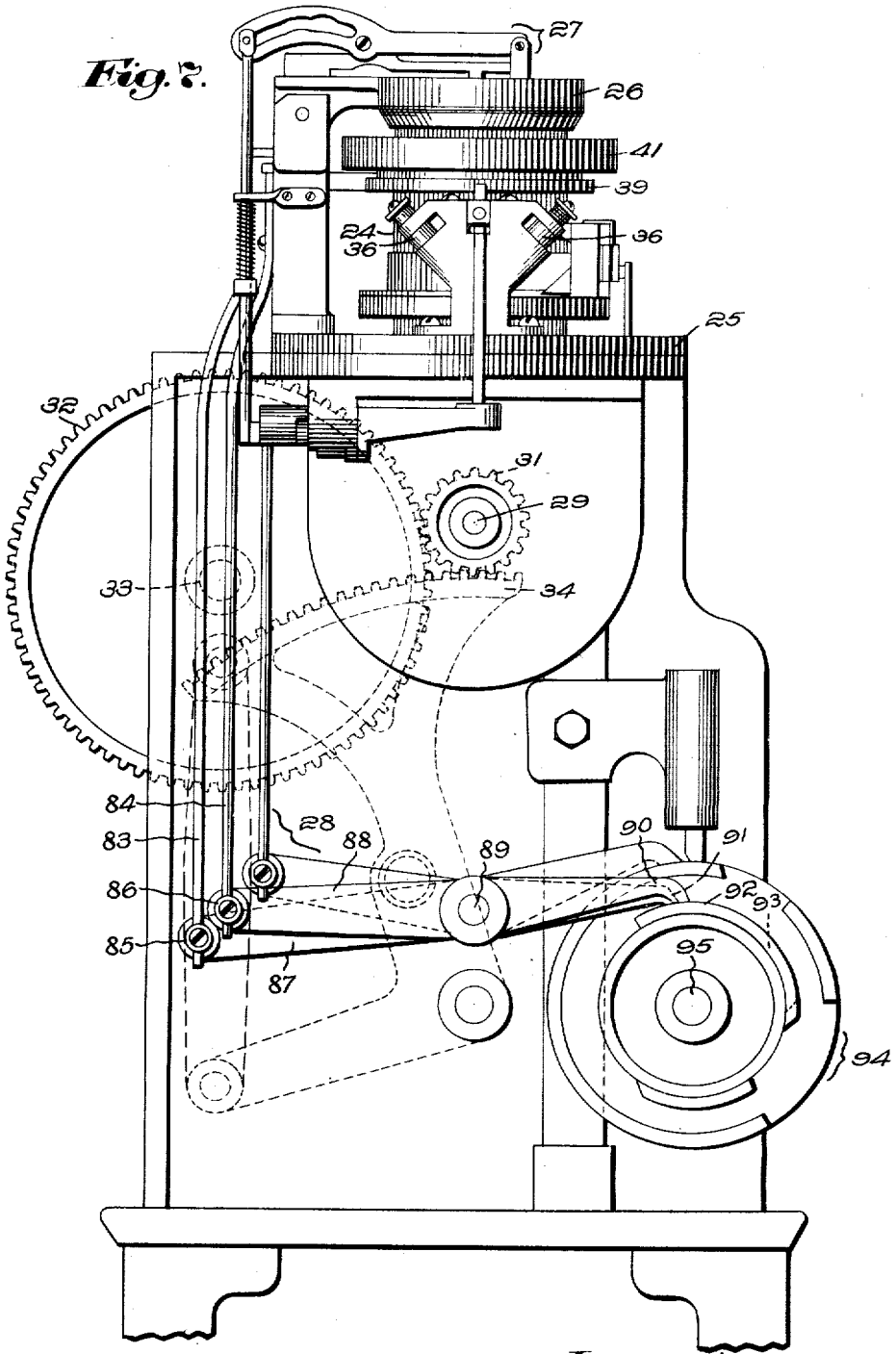
Fig. 7 is an end elevation of a knitting machine having the mechanism of my invention applied thereto and by which my process or method may be practiced.
Figure 15:
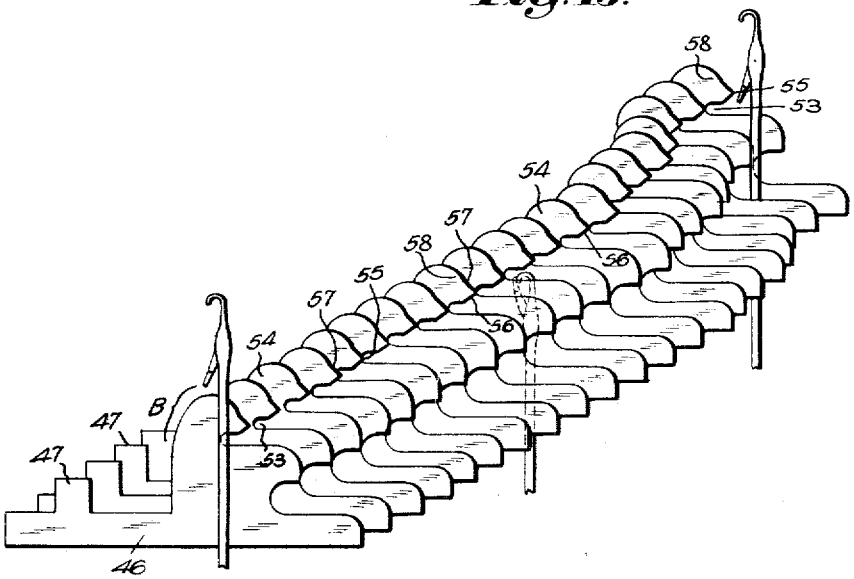
Fig. 15 is a perspective view of certain of the casting off instrumentalities employed in making the hose or stocking of Figs. 1 and 2 and the associated needles, etc.
Figure 16:
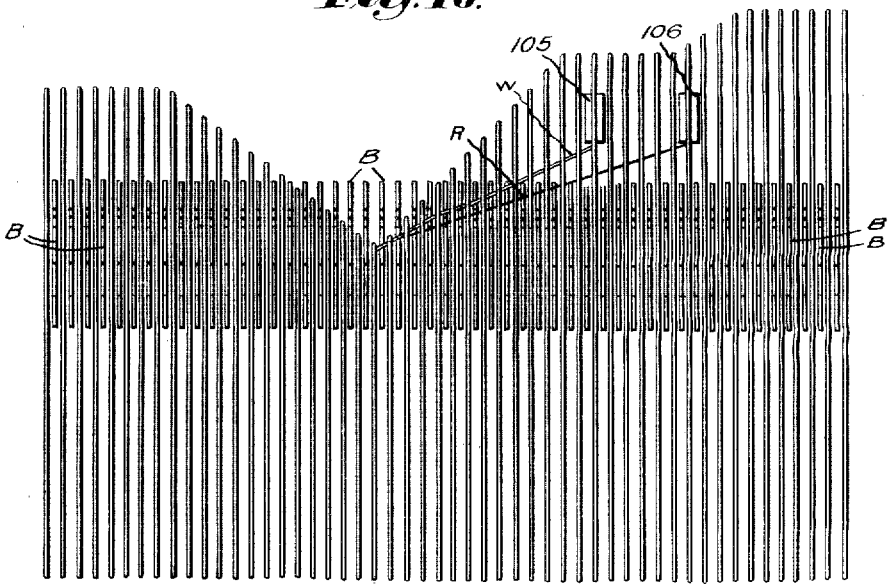
Fig. 16 is an end view of the parts shown in Fig. 15.
Figure 17:
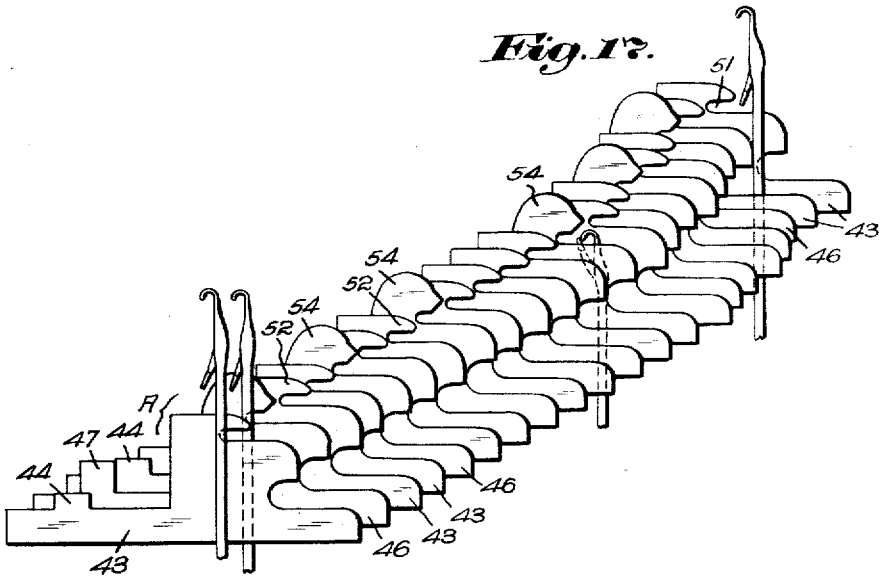
Figure 18:
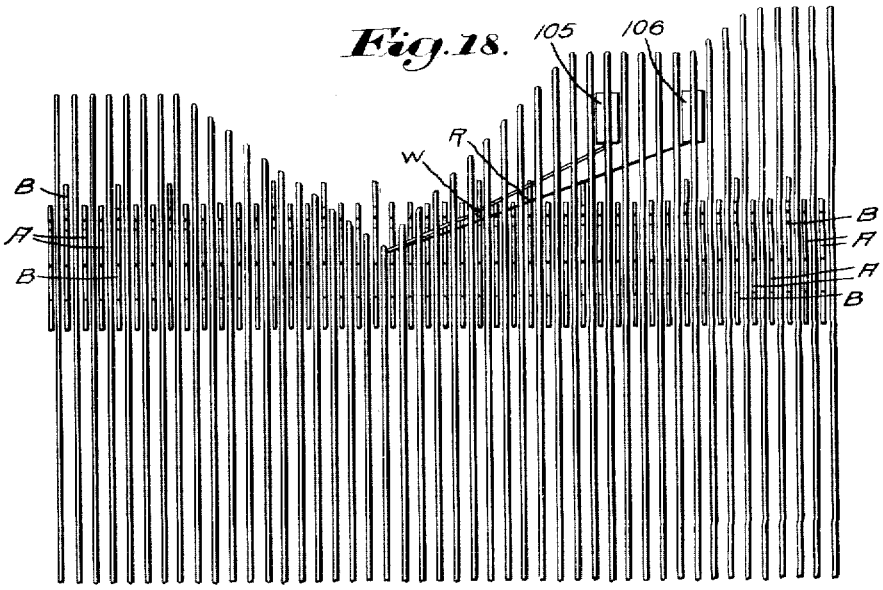
Figure 19:
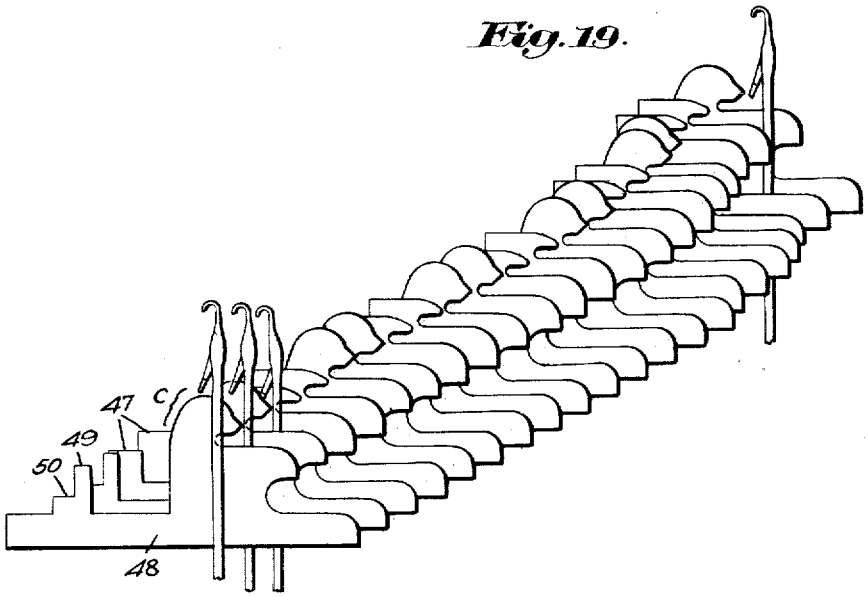
Figure 20:
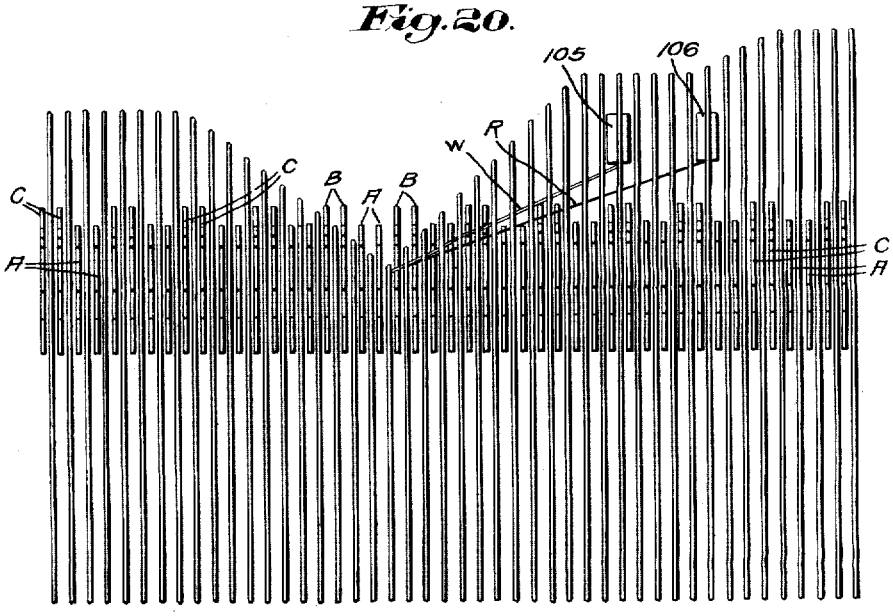
Figure 22:
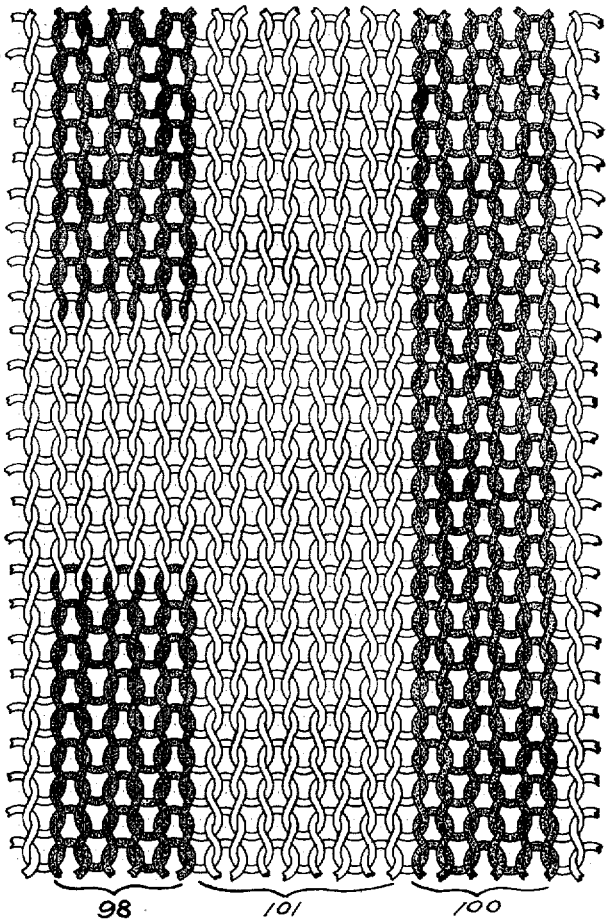
Figure 21:
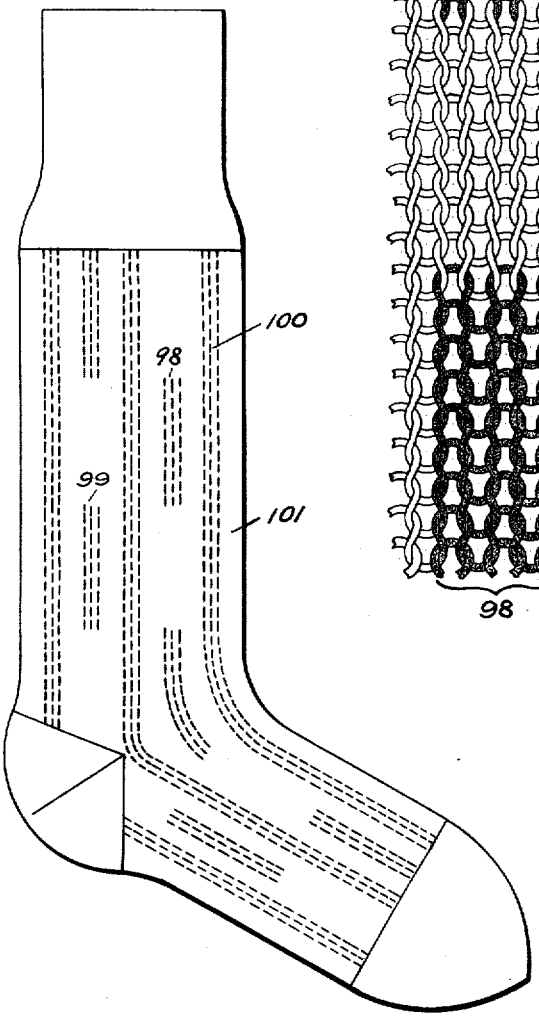
Figure 23:
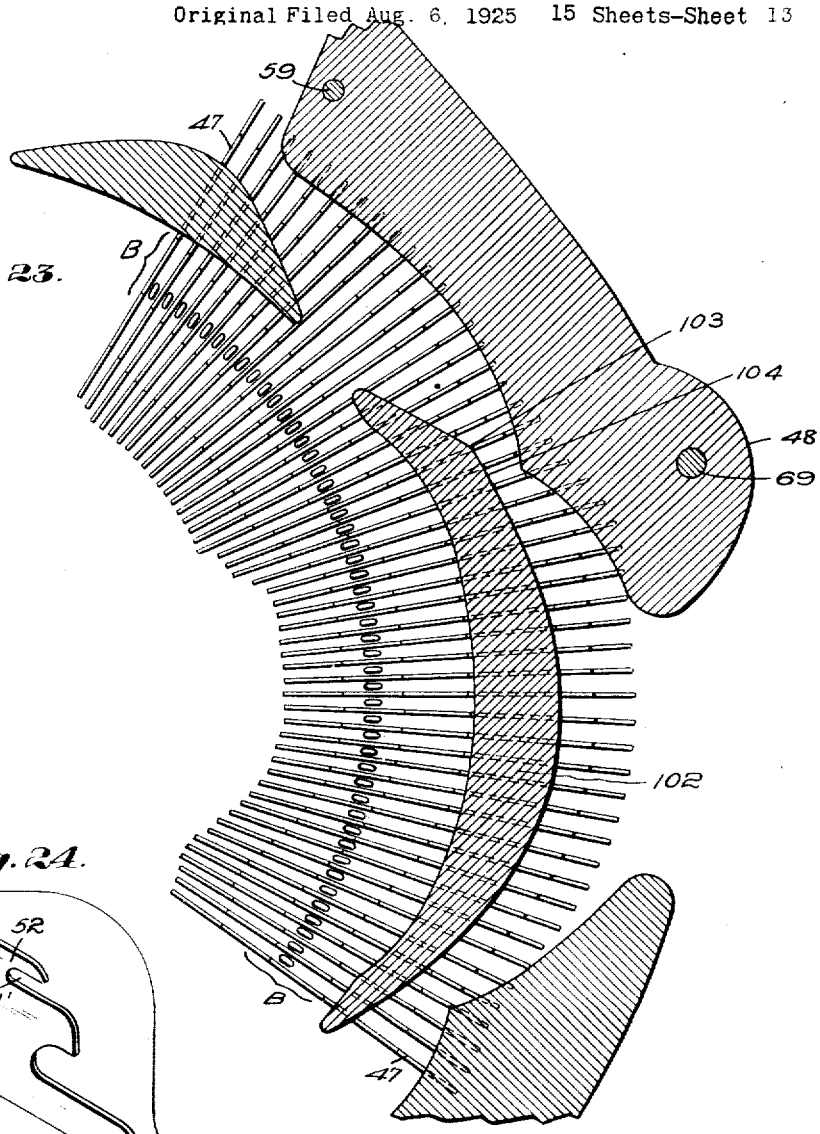
Figure 24:
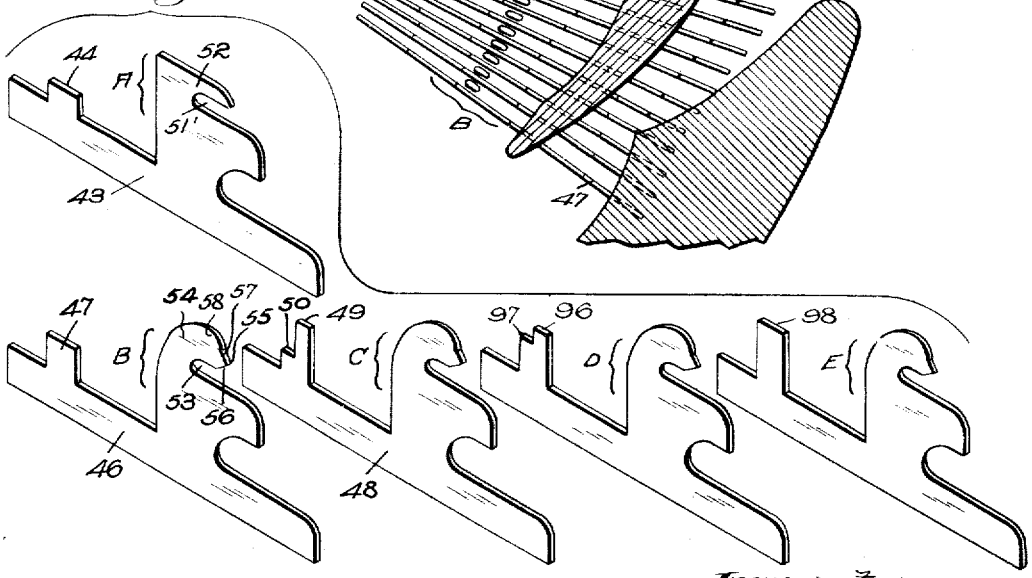

Figs. 17 and 18 are views similar to Figs. 15 and 16, but of the parts employed in making the hose or stocking of Figs. 3 and 4;

Figs. 19 and 20 are views similar to Figs. 15 and 16, but of the parts employed in making the hose or stocking shown in Figs. 5 and 6;

Fig. 21 is a view similar to Fig. 1 but representing still another arrangement of vertical stripes;

Fig. 22 is a detail, on a more enlarged scale, of a portion of the fabric shown in Fig. 21;

Fig. 23 is a detail in plan of certain of the web holders and their operating cams;

Fig. 24 is a perspective view of five differentiated web holders, being one regular and four special web holders that may be used with the machanism herein disclosed;

Fig. 25 represents, in side elevation, seven different positions of a special web holder and the adjacent needle, in the formation of a reversely plated loop;

Fig. $25^{a}$ is an enlarged view of the needle as shown in Fig. $25^{E}$.

Figures 29, 30:
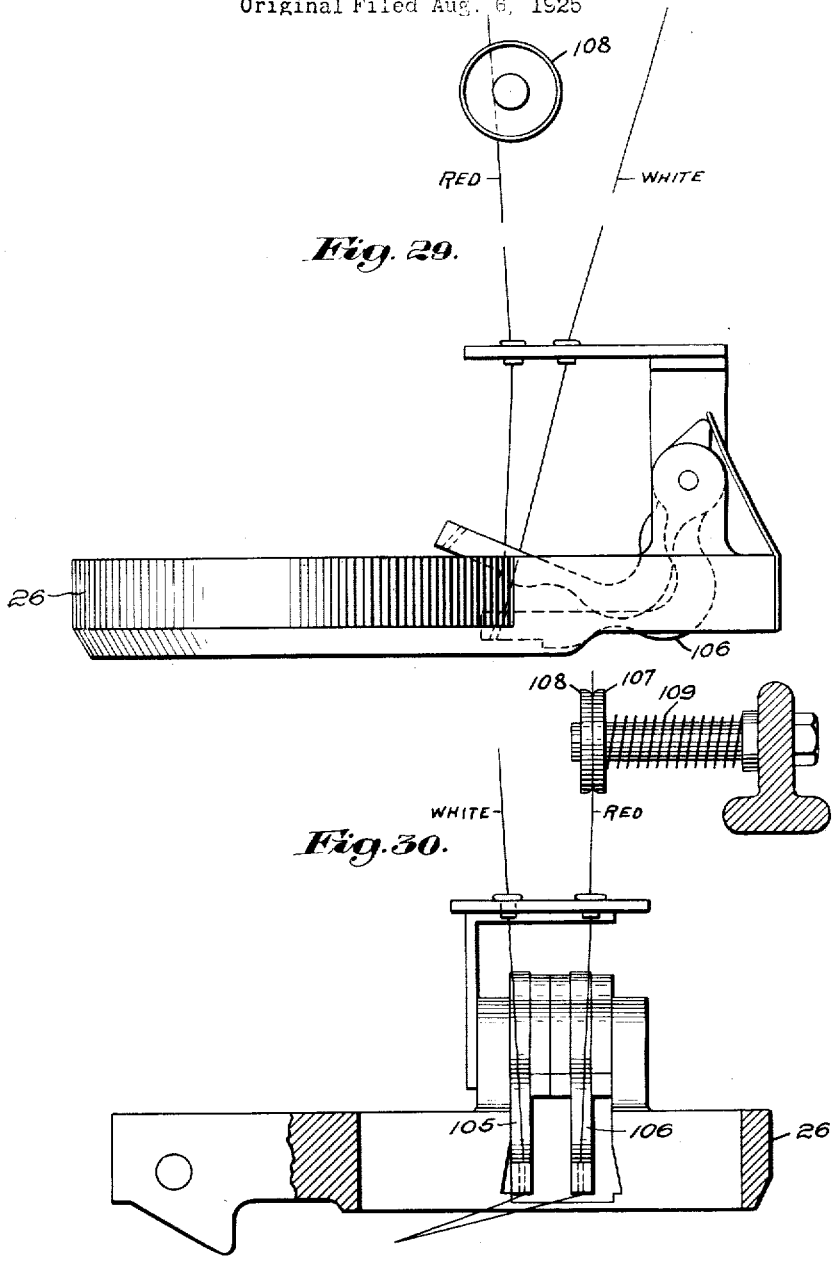

Fig. 26 is a representation, similar to Fig. 25, of corresponding positions of a regular web holder and the adjacent needle, in the formation of a normally plated loop;

Fig. $26^{a}$ is an enlarged view of the needle as shown in Fig. $26^{E'}$;

Figs. 27, $27^{a}$, 28 and $28^{a}$ are enlarged views, in side elevation, of needles that may be used in the practice of my invention in the formation of reversely plated and normally plated loops respectively;

Fig. 29 is a view in side elevation of the latch ring, one of the yarn fingers and the means for feeding the two yarns or threads to their thread guides; and Fig. 30 is a transverse section of the structure shown in Fig. 29, and shows all the yarn guides.

In accordance with my invention, I provide lengthwise extending stripes in fabrics formed wholly or in large part by a plating action, such fabric being herein represented as a hose or stocking. It is evident, however, that my invention is not necessarily limited to the production of hosiery, although it is peculiarly adapted thereto and I shall disclose the same as made upon a circular knitting machine of the independent needle type.

Lengthwise extending or, what may briefly be termed as "vertical" stripes, have long been made in hosiery and other knitted fabrics. For example (and using the term "vertical" in a broad sense as meaning extending in a direction generally lengthwise of the fabric) vertical stripes have been made by employing two yarns, which are fed together, and in such manner as to produce plating, and at the desired points floating one of said yarns so as to produce a stripe of the color of the other yarn.

My invention is radically contrasted from those fabrics wherein the vertical stripe is produced by the floating of one of the yarns at predetermined times. In accordance with my invention plating the fabric throughout the whole or a predetermined extent thereof is effected (if the fabric be a hose or stocking, the heel and toe and the garter top or upper end thereof are desirably not plated), and where a vertical stripe is desired I effect a reversal of the plating operation. That is, upon certain parts of the plated work, I cause one of the threads to appear upon the outer face thereof and in other parts I cause the other thread to appear upon the outer face thereof, thus securing a so-called vertical striping. Such vertical striping may be characterized by continuous or long stripes, or by short or interrupted stripes, or various combinations of continuous and interrupted stripes may be resorted to, with the result that a great variety of effects may be produced in accordance with my invention.

I am aware that there has been proposed as disclosed in the patent to Tebbutt, No. 1,145,522, July 6, 1915, to form full fashioned goods having single needle stripes wherein two yarns are fed in a plating relation to each other, and wherein, by the employment of a so-called thread reversing divider, the two yarns are slackened where the single needle stripe effect is to be secured, and such slackened yarns are rolled upon each other by said thread reversing divider to secure a reversal of the plated appearance.

My invention, not only as to mechanism and process but also as to fabric and instrumentalities employed, is sharply contrasted with the disclosure in said patent to Tebbutt, in various ways which will be more specifically referred to hereinafter. For example, I operate with independent needles, between which are positioned casting off instrumentalities herein shown as web holders and, when no vertical striping is to be effected, all said web holders or instrumentalities act in what may be termed a normal manner, so that what I may term normal plating results. Certain of said web holders or instrumentalities are of peculiar formation and, when reverse plating is to be secured, are projected inward at an earlier point circumferentially considered, in accordance with my invention (in other words, at an earlier point in the stitch forming operation than the regular web holders), so as to engage the yarn which was the backing yarn during normal plating, and so to position the same that it becomes the facing or front yarn. By the employment of suitable means, preferably automatic, the normal plating may be interrupted at any point and reverse plating may be effected at any desired wales and continued for as few or as many courses as desired, then to be replaced by normal plating.

Such normal and reverse plating are effected without any change in the relative tension of the two yarns and no measuring of the yarn is effected in the formation of the loop, as is characteristic of full fashioned knitting machines.

Referring more particularly to the drawings, I have, in Fig. 1, represented at 1 a hose or stocking having a top portion which, in the case of a stocking, may be the garter top or, in the case of a hose, may be a rib top. The stocking is formed upon a circular independent needle machine, preferably of the latch needle type, and the heel 2 and toe 3 are preferably formed by reciprocating knitting. The leg 4 and foot 5 are preferably formed by rotary work and I have therein indicated short stripes 6 of one color alternating with short stripes 7 of another color. In the particular structure shown in Fig. 1 each stripe 6, when discontinued is replaced by a stripe 7 in the same wales, and the constant repetition of this effect produces the result shown and which is merely one example of the effect which may be produced.

Figure 2:
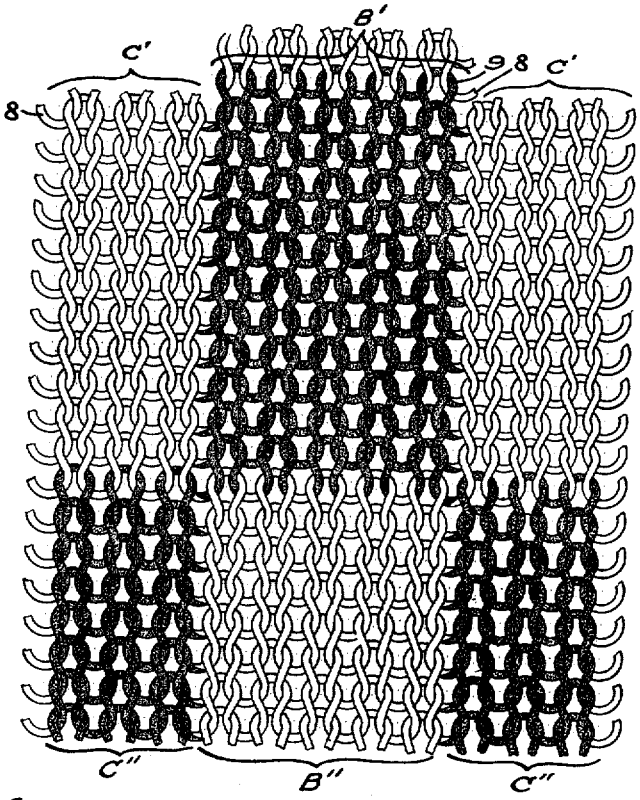
Fig. 2 is a very much enlarged detail, illustrating enough of the stitches or loops to make apparent the structure of the fabric of Fig. 1.

Referring to Fig. 2, it may be assumed that the short stripe therein indicated at B′ is produced by feeding a white yarn 8 and a red yarn 9 in such manner (namely with the red yarn under tension and the white yarn without tension, and also with the red yarn fed slightly in advance, circumferentially considered, of the white yarn, all as hereinafter disclosed) that the red yarn 9 appears upon the outside or face of the fabric at the points indicated, the white yarn 8 being at such points also knitted into the fabric in each loop thereof but plated therewith, so that it will appear only at the back or inside face of the stocking or other fabric at such points. The white stripes C′ C′, on the contrary, are produced by causing the casting off instrumentalities (herein disclosed as web holders) to push or force the white yarn to the front, so that it appears upon the outer or front face of the fabric; the red yarn, therefore, notwithstanding the tension thereon, appearing at the inner or rear face of the fabric.

In Figs. 3 and 4 I have indicated another effect produced in accordance with my invention. In Fig. 3, the stocking 10 has continuous vertical or lengthwise stripes 11 of one yarn (red), between which are equal length stripes 12 of the other yarn (white). While these stripes may be of any desired width, I have represented certain relatively wide white stripes 12 and I have shown the red stripes 11 as of a single needle width only, although it is to be understood that they may be of any desired width. Each red stripe 11 is formed by what I term reverse plating and the red yarn 13 appears at the front and the white yarn 14 at the back, whereas this appearance is reversed in the white stripes 12, which are formed by normal plating.

In Figs. 5 and 6, I have represented still another appearance characteristic of my invention. Therein the hose or stocking 15 is provided with certain uninterrupted red stripes 16 caused by normal plating and certain short or interrupted red stripes 17, also caused by normal plating, between which are white stripes 18 caused by reverse plating and which may be interrupted or continued as desired. In this embodiment of the fabric of my invention and as shown also in Fig. 6, I have represented certain horizontal stripes 19, which may be of any color desired but which are herein indicated as white. Such horizontal striping, which may also be employed with or in producing the fabric of Figs. 1, 2, 3 and 4, is preferably produced by interrupting momentarily or for any desired length of time the feeding of both the plating yarns and substituting therefor one yarn or two yarns both of the same color which are fed without any plating relation so as to produce the horizontal stripes 19 which in turn are discontinued when plating and reverse plating are again employed.

Thus the fabric of Figs. 5 and 6 is produced by three or it may be four yarns there being a red 21 and a white yarn 22 both knitted upon all the needles in a plating relation respectively normal and reversed to make the vertical stripes and a single yarn 23 or a double yarn which is substituted for the yarns 21, 22 and is continued only so long as the horizontal stripe is to be made.

Referring now to the mechanism by which the fabric is produced, it is to be understood that, assuming for purposes of description the fabric is a hose or stocking, the same is knitted upon a circular machine of the independent needle type. My invention may be applied to or embodied in various types of such circular knitting machines, but I have chosen to represent the same as applied to a machine of the well known "Banner" type disclosed in the patent to Joshua D. Hemphill, No. 933,443, dated September 7, 1909. In this type of machine the needle cylinder rotates while the cams remain stationary and, although the machine disclosed is for the purpose of producing hosiery, it is obviously not limited to this class of work. I will, however, describe my invention as applied to a machine of such type without limiting it thereto excepting when expressly so stated in the claims.

Generally speaking the machine includes a rotating needle cylinder 24 mounted upon a suitable table 25 constituting a part of the frame of the knitting machine and, as is customary in this type of machine, said cylinder is arranged to be rotated to form the leg and the foot and to be reciprocated to form the heel and toe of the stocking. The means for effecting the rotary and reciprocating movement are substantially the same as those shown and described in the said Hemphill patent and, being well known, require no further description.

A plurality of yarn feeding elements is provided so as to feed not only the two yarns for plating but so as to feed such other yarns as may be required as, for example, the yarn or yarns for producing the horizontal striping, the yarn or yarns for the heel, the yarn or yarns for the toe, and the high splicing and sole reinforcing yarn. Such feeding elements and the means for controlling the same will be hereinafter more fully referred to.

Figure 8:
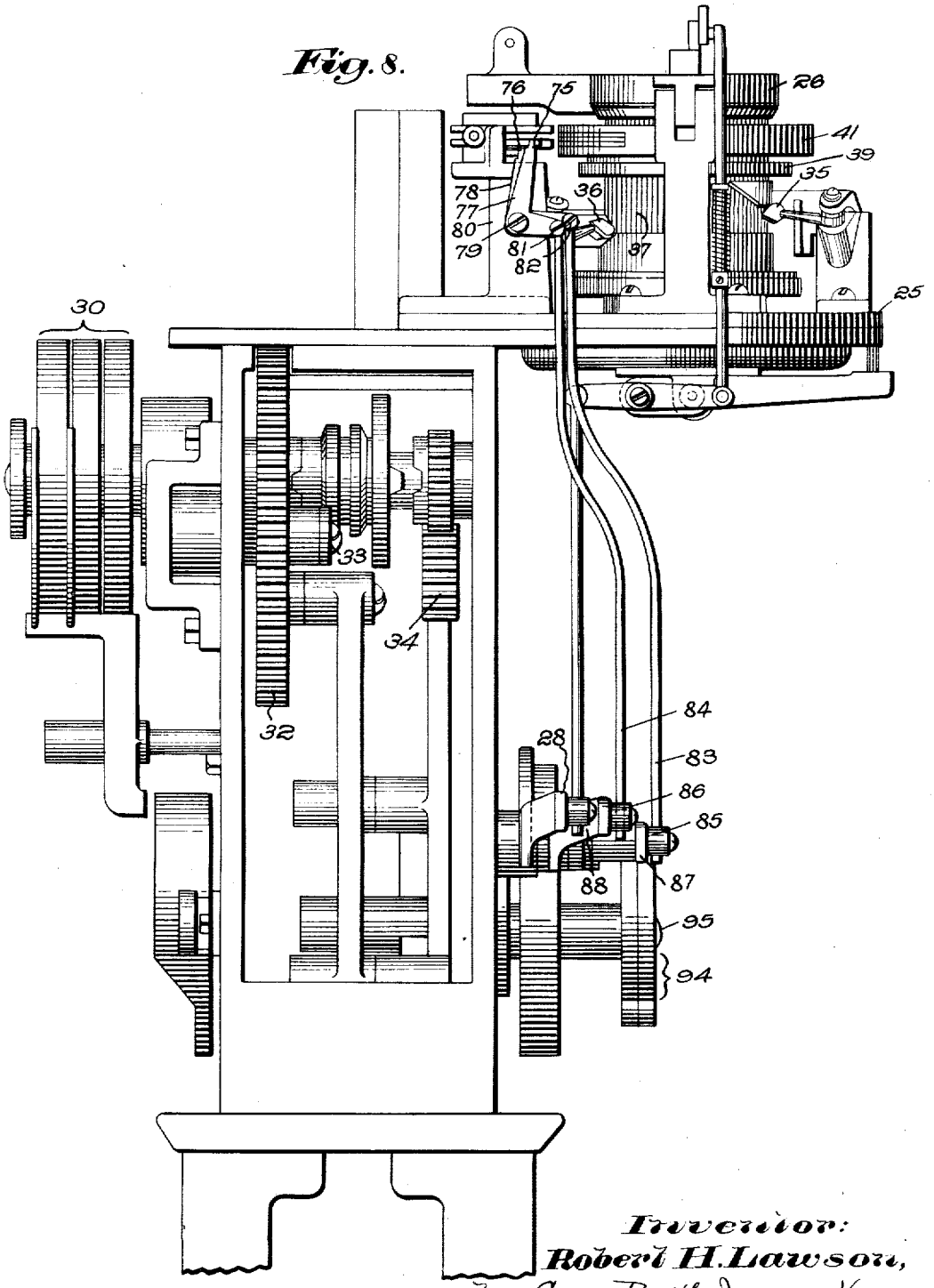
Fig. 8 is a rear elevation of the mechanism shown in Fig. 7.

The machine is, as stated, of the independent needle type and the needles are desirably latch needles, as will be hereinafter more fully pointed out. Therefore, I employ a latch ring 26 equipped with suitable binder mechanism generally indicated at 27 and controlled by link and lever mechanism generally indicated at 28 and which need not be further described otherwise than to state that the same is controlled from the pattern cylinder. The entire mechanism is driven from the main drive shaft 29, having thereon the usual pulleys indicated at 30 in Fig. 8, and also having suitable gearing including the pinion 31 for driving the large gear 32 known as the 104 gear and which is mounted upon the shaft 33. From said main drive shaft is also driven in usual manner the quadrant 34, whereby the machine is reciprocated during the knitting of the heel and toe. The machine is also provided with the usual narrowing pickers and the usual widening pickers, which are indicated at 35 and 36 respectively, see particularly Fig. 9. These pickers are desirably those of the said "Banner" machine and require no further description.

Figure 11:
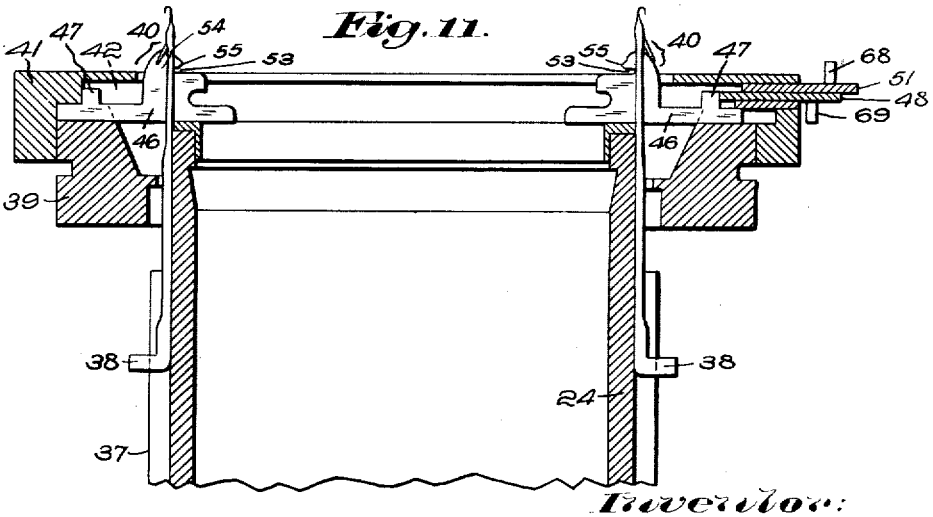
Fig. 11 is a vertical, central, cross section of the mechanism shown in Fig. 10.
Figure 12:
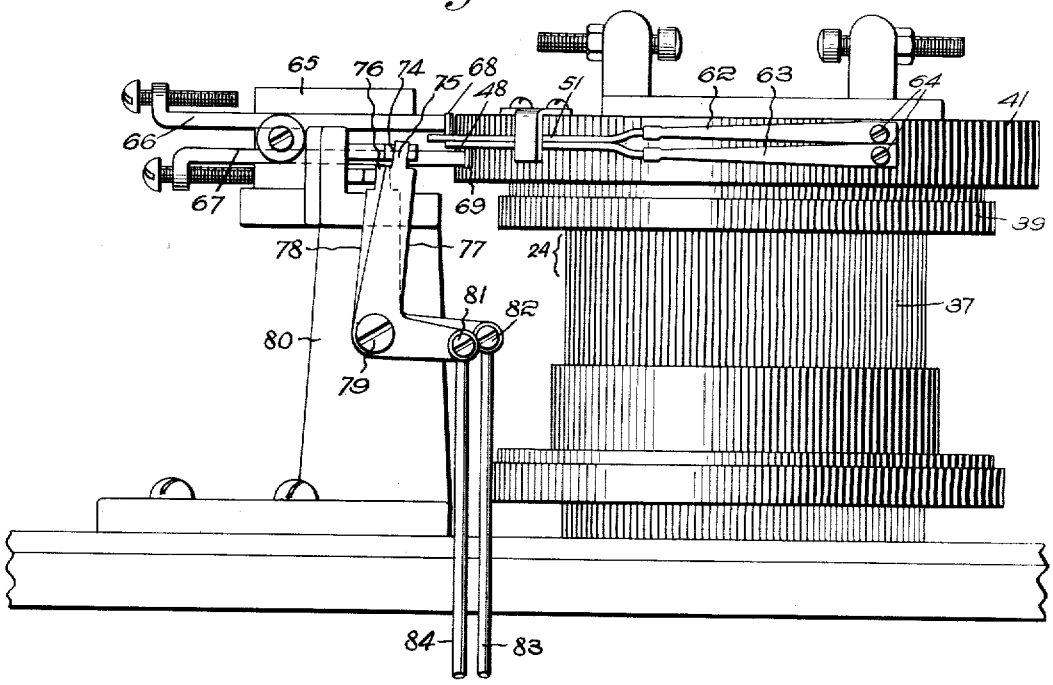
Fig. 12 is a rear elevation of the head of the knitting machine and adjacent parts of the mechanism for controlling the cams shown in Fig. 10.
Figure 13:
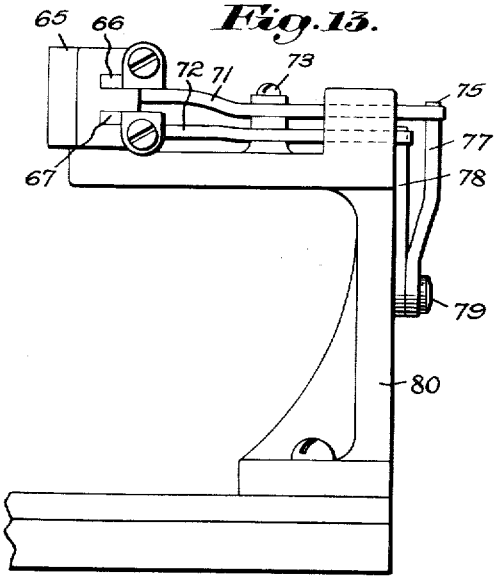
Fig. 13 is an elevation of said mechanism viewed from the left in Fig. 12.
Figure 14:
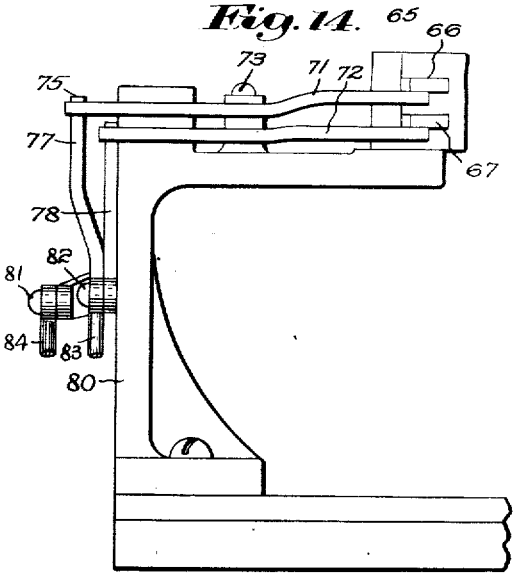
Fig. 14 is an elevation of said mechanism viewed from the right in Fig. 12.

The needle cylinder 24, as most clearly shown in Fig. 11, is provided with the usual needle grooves 37, wherein are mounted the latch needles 38. At the upper end of the cylinder is provided the usual web holder bed ring 39 having formed at its upper face, as usual, radial grooves receiving web holders indicated generally at 40, capable of radial movement in said grooves and reciprocated therein by certain cams now to be particularly described. The cap ring 41 is provided and, excepting as hereinafter pointed out, the bed ring 39 and the cap ring 41 are or may be of the usual construction. The said cap ring 41 has formed in its under face a suitable channel 42 to receive the upwardly extending butts of the entire series of web holders.

The said web holders, instead of being all of the same construction and of the same length of butt, are contrastingly formed, desirably as follows:

What may be termed the regular web holders are generally indicated at A in Fig. 17 and elsewhere. The said regular web holders are provided with rearwardly extending guide portions 43 having short upwardly extending butts 44 to be operated by the cam 45 therefor, shown most clearly in Fig. 10 and which cam desirably constitutes a fixed part of the cap ring 41, since its position in said cap ring is or may be invariable. I employ one or a plurality of sets of special web holders, but desirably two sets thereof, for purposes which will be apparent. I have indicated at B in Fig. 15 and elsewhere one of the web holders of the first special set, it having the rearwardly extending guide portion 46 and the medium height butt 47. The butts 47 of this group of web holders B are operated by the fixed cam 45 when said web holders B function as regular web holders and by the radially movable cam 48 when functioning as special web holders. Said movable cam 48 is clearly shown in plan in Fig. 10 as positioned directly over the regular cam 45. In addition, in this embodiment of my invention, I also employ a group of special web holders C having rearwardly extending guiding portions 48 and high butts 49, desirably notched, as indicated at 50. The said butts 49 are operated by the fixed cam 45 when said web holders C function as regular web holders and by the radially movable cam 51 shown in Fig. 10 as overlying the cam 48, when functioning as special web holders.

The web holders A are each provided with the throat 51′ and above the same with the portion 52 of relatively slight height. The web holders B and C are provided with the throats 53 and thereabove are provided with the portions 54 of much greater height than the portions 52 of the regular web holders. Said portions 54 are of peculiar formation. They are provided with quite sharp noses 55, below each of which is the inclined edge 56 and above which is the inclined edge 57, the latter extending back to an edge 58, which is inclined backward at the angle shown instead of being vertical. I have discovered, in the course of my experimentation that, if the faces 58 were vertical, they would occasionally cause a severing of the yarn against the adjacent needles at one side or the other in making the heel or toe (and hence when acting as regular web holders) whereas, when the edge 58 is inclined as shown, the yarn may slip up the said edge and be released at the top of the web holder instead of being caught and severed by a vertical edge of the web holder and the adjacent needle stems.

If a stocking without the vertical striping is desired, that is, if solid or what I term normal plating is to be provided, all of the web holders, including the special web holders B and C as well as the regular web holders A, are moved inwardly to the same radial extent, and function as usual web holders. If, however, vertical striping is to be provided, one or both groups of said web holders B and C, according to the pattern desired, is or are moved inward at an earlier period by means of their respective cams 48 and 51, so as to cause each of said special web holders that is to function in the creation of reverse plating to engage the back yarn (that is, the white yarn of Figs. 1, 2, 5 and 6, or the red yarn of Figs. 3 and 4), so as to move the same inwardly in advance of the yarn which had appeared at the front in normal plating, so that the result is to produce stripes of a width determined by the number of consecutive special web holders B or C and of a length dependent upon the length of time the cam 48 or the cam 51 therefor is in its inner radial position and which in turn is dependent upon the pattern control, and of the color of the back yarn during normal plating.

The cams 48 and 51 are coaxially pivoted at 59 in the cap ring 41 and are provided with rearwardly extending ends 60, 61 respectively engaged by springs 62, 63 secured at 64 upon the cap ring and acting normally to force said cams 48 and 51 outwardly into a position where they will not act upon the butts of the respective web holders B and C, or at least will not move them inwardly otherwise than is done by the regular web holder cam 45.

Figure 9:
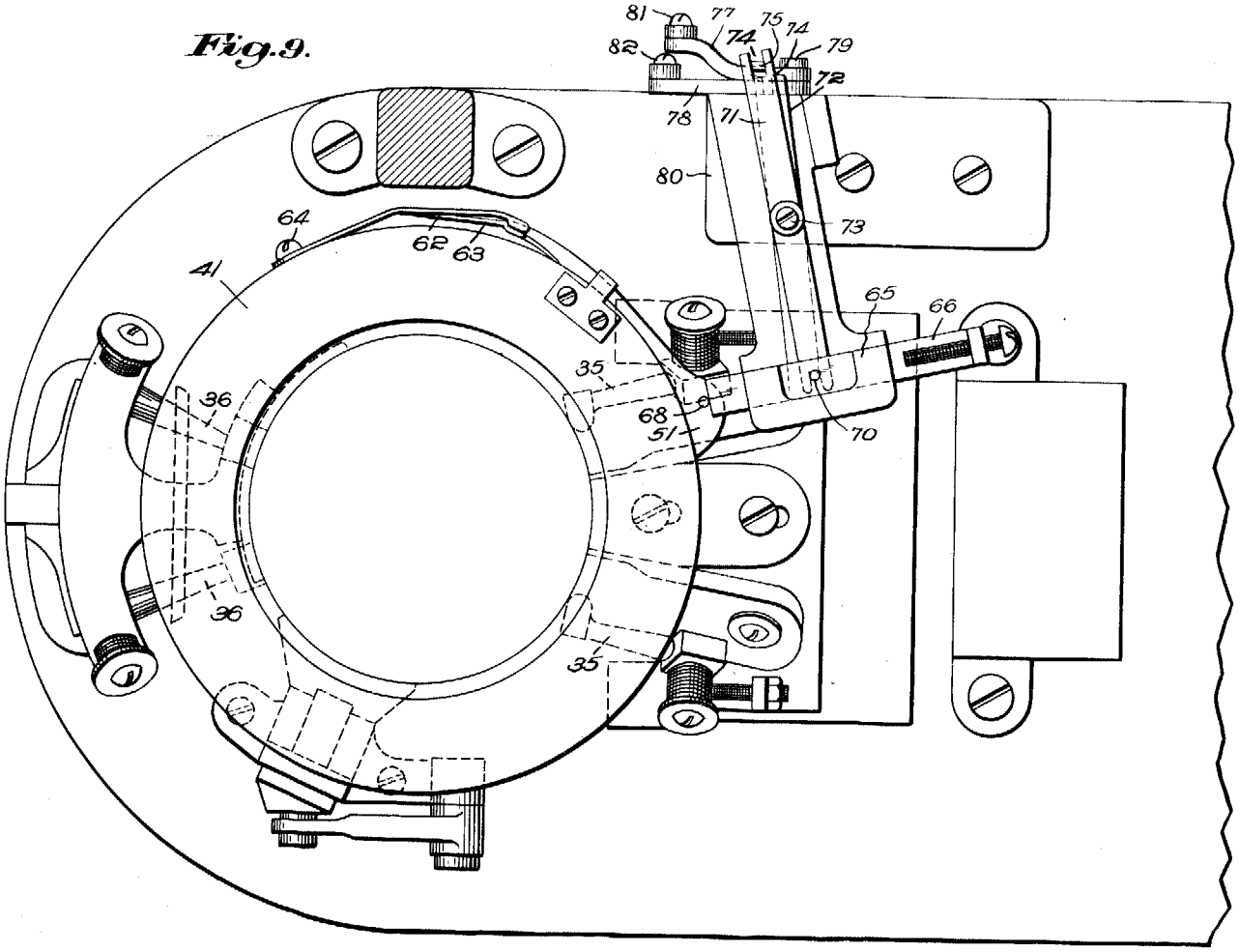
Fig. 9 is a horizontal section taken under the latch ring of the machine and showing a portion of the means for effecting the control of the casting off instrumentalities or web holders in accordance with my invention.

In a bracket or standard 65 located at the narrowing picker side of the machine, as illustrated in Fig. 9, are mounted for sliding movement two bars 66, 67, of which the overlying or upper bar 66 strikes a pin 68 upon the overlying cam 51 and the lower bar 67 strikes a pin 69 upon the underlying movable cam 48. Thus, at times determined by the respective controlling means for the said bars, one or the other of the said cams 48, 51 is moved radially inward sufficiently for it to cause the special web holders controlled thereby to engage the back yarn and effect reverse plating in the manner already described.

Each bar 66, 67 is connected by a pin, one of which is indicated at 70 in Fig. 9 to the proper lever 71, 72, pivoted at 73 upon the framing of the machine so as to be swung in a horizontal plane at the proper times. The levers 71 and 72 are at their outer ends notched, as indicated at 74, 74, and are there engaged by the reduced ends 75, 76 of bell crank levers 77, 78 coaxially pivoted at 79 upon a bracket 80 and respectively connected at 81, 82 to downwardly extending links 83, 84, which are respectively connected at 85, 86 to levers 87, 88 coaxially pivoted at 89 upon the framing. The inner ends of said levers 87, 88 are provided with noses 90, 91 that ride upon suitable cams 92, 93 on cam or pattern drum 94 upon the usual pattern shaft 95.

The cams upon the pattern drum, which control said levers 87, 88 are of such length and such shape as to provide vertical stripes, by a reverse plating action, of the length desired.

The stocking in Figs. 1 and 2 is made by using only special web holders B and C. In the middle part of Fig. 2 the special web holders B are used to effect the normal plating in red and these web holders are then pushed in by their special cam 48 as described to make the reverse plating in white therebeneath. At right and left the special web holders C are used and they make the white reverse plating when pushed in but, if they operate as normal web holders, they will make the red therebelow.

The stocking in Figs. 5 and 6 is made by the use of all three web holders A, B and C. The short red rows are made by the plain web holders A and the red would be continuous were it not interrupted to make the horizontal stripes made by the introduction of a new yarn, namely, a white yarn. The uninterrupted white stripes are made by the special web holders B which are pushed in by their own cam 48, namely, the cam lying next above the stationary cam.

Figure 10:
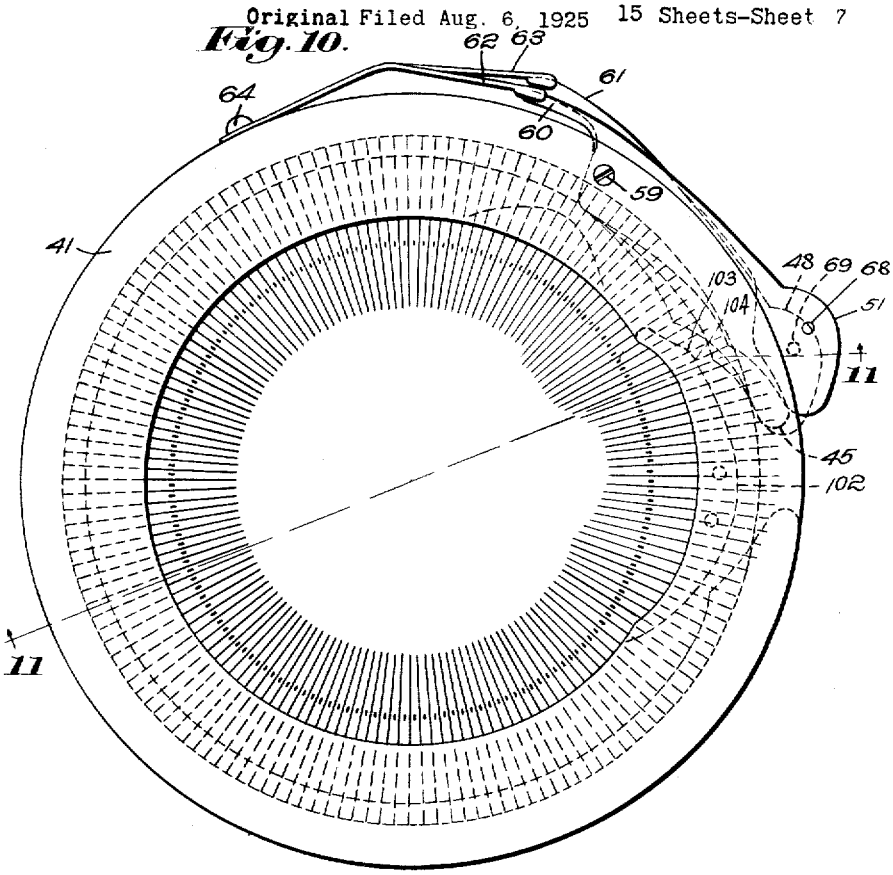
Fig. 10 is a plan view, with parts shown in dotted lines, of the head of the knitting machine, having certain controlling cams applied thereto in accordance with my invention.

Referring again to Figs. 1 to 6 inclusive and to Figs. 10 and 11, it is to be understood that Figs. 1 to 6 are typical only of certain pattern effects which may be produced, and that my invention is in no wise limited to the production of said patterns. If any portion of the stocking or other fabric is to be made with solid uniform plating throughout complete courses, all the web holders act as regular web holders whether as a matter of fact, they are of the type of web holders A or B or C and, in such case, their butts are all engaged by the stationary cam 45 and project in only at such time as to produce normal plating which, in the case of Figs. 1, 2, 5 and 6, may be assumed to be red and, in the case of Figs. 3 and 4, may be assumed to be white. If reverse plating is to be made at any point, this depending upon whether the reverse plating is to be effected by the use of web holders B or web holders C, the cam 48, or 51, as the case may be, is pushed in by the connections described, so that said special web holders B or C are projected in radially at an earlier period, that is, slightly sooner as already described, so as to push what in normal plating was the back yarn over into such a position that it becomes the front or facing yarn, and reverse plating occurs.

Referring specifically to Figs. 1 and 2, it is to be understood that the fabric or stocking there shown (aside from the top, the heel and the toe), is made wholly by the use of the special web holders B and the special web holders C. The portion shown in red in the upper part of the center of the figures and herein indicated by a bracket B′, is produced by the special web holders B, which, in making said portion B′ of normal plating, are pushed in by the stationary cam 45 at the regular time, thus making normal plating. The white portion in the same wales therebelow and marked B″ is produced by moving inwardly the cam 48 so as to engage the butts of these web holders B (namely, the medium height butts) and thereby cause the white yarn to be pushed to the front and reverse plating to occur.

The white short stripes to the right and to the left of the bracket B′ and herein marked C′ C′ are produced by the special web holders C, being projected inwardly by their cam 51 so that they engage the white yarn and push the same to the front and thereby effect reverse plating. The short stripes indicated as red below the short stripes C′ C′ and herein marked C″ C″ are produced by withdrawing the movable cam 51 and causing said special web holders C to be pushed in only by the regular cam 45 and hence only at such time as to effect the production of normal plating.

It will be understood that I may vary the pattern shown in Fig. 2 in various ways, as, for example, by employing a suitable number of regular web holders A between each group of web holders B and web holders C. In that case said web holders A would operate to produce a continuous longitudinal stripe in red, thus giving a characteristically different appearance.

The fabric shown in Figs. 3 and 4 is produced by the use of regular web holders A and special web holders B only. In the particular design or pattern shown, it is assumed that the normal plating is quite in color, thus making the stripes 12, and at said stripes 12 of normal plating there are employed the regular web holders A, which are operated by the fixed cam 45 to effect normal plating. To make the stripes 11 which, in this instance, are reverse plating, I employ special web holders B, which are pushed in by their cam 48, the said cam being kept in its innermost position throughout the knitting of the entire leg and foot of the stocking, so that reverse plating occurs continuously throughout such parts.

In making the stocking shown in Figs. 5 and 6, I employ all three sets of web holders A, B and C and in addition I interrupt all the plating so as to produce horizontal stripes indicated at 19. It is to be understood, however, that said horizontal stripes may be omitted from the pattern shown in Figs. 5 and 6 and that I may use horizontal striping with the organization employed to produce the patterns of Figs. 1, 2, 3 and 4, in which case the patterns would be correspondingly different.

In producing the pattern of Figs. 5 and 6, I employ the regular web holders A to make the normal or red plating indicated at A′ at several points. Said normal plating would therefore be continuous were it not for the interposition of the horizontal stripes. At the points indicated by the bracket $B^a$, I employ the special web holders B and move them inwardly by their cam 48, so that reverse plating occurs because of their engagement of the white yarn and their pushing the same forward. Such white stripe is shown as continuous in Fig. 6. In addition to the web holders A and B, I also employ the web holders C, which, in this case, are employed to produce short white stripes as indicated at C′, in Fig. 6, said web holders being pushed in by their cam 51 at the proper time to effect reverse plating because they engage the white yarn and push it to the front.

It is to be understood that the stripes produced by either set of web holders B or C may be continuous or discontinuous, this being effected by moving the controlling cam therefor from the inner position thereof to the outer or inactive position, so that said web holders B and C are acted upon only by the fixed cam 45. But in those cases where I desire to make not only a stripe or figure of normal plating, but also long lines of reverse plating and in addition short lines of reverse plating, I employ both special web holders B and C. That is to say, if, in the same course or consecutive courses, I am producing not only certain wales which constitute parts of regular plating, but also other wales some of which are parts of continuous wales of reverse plating and some of which are parts of interrupted lines of reverse plating, I employ all types of web holders A, B and C.

In the foregoing description, I have referred to the use of one regular form of web holder (A) and two special forms of web holders (B and C). It is to be understood, however, that my invention is not limited to the use of such web holders or of only such web holders, and I will now describe one typical further development thereof.

In Fig. 24 I have represented five differentiated web holders which may be used with the mechanism already described. Three of said web holders, namely, A, B and C, are the same as those already described. In addition I have shown web holders indicated as D and E. Said web holders D and E desirably have upper ends of the same form as web holders B and C, and are otherwise the same excepting that the web holder D has a butt 96, the lower part whereof is of the same extent from front to rear as the lower part of the butt of the web holder C, but the notch 97 is at a higher elevation than that of web holder C so that it can be operated by the lowest cam (45) and by the next overlying cam (48) and also by the topmost cam (51), and the web holder E has a butt 98 higher than the butt of the web holder B, so that it can be operated by each of the cams 45, 48 and 51.

It will be observed that, referring to the two movable cams 48 and 51, the special web holder B can be operated only by the cam 48; the web holder C is operated only by the cam 51; the web holder D can be operated by the cams 48 and 51; and the web holder E can be operated by the cams 48 and 51. It is to be understood that, if the web holder C or D is being used, then the web holder E cannot be used because of the greater width of the upper end thereof and that, if the web holder E is being used, then neither web holder C nor D can be used, because of the narrower width of the upper end thereof.

As one illustration of pattern effect that may be secured by using more than two forms of special web holders, I have represented, in Figs. 21 and 22, a hose or stocking the pattern effect whereof is produced by using special web holders B, C and D.

In said figures the short red stripes 98 are reverse plating and are produced by using the special web holders B for that purpose; the short red stripes 99 are also reverse plating and are produced by using the special web holders C for that purpose; and the long red stripes 100 are also reverse plating and are produced by using the special web holders D for that purpose. The remainder 101 of the leg and foot of the stocking is normal plating, and therefore is produced by the use of the regular web holders A.

It will be observed that the short red stripes 98 and 99 occupy a staggered relation with respect to each other and therefore cannot both be produced by exactly the same form of special web holder, that is, they must be differentiated as to their butts.

In Fig. 23, I have represented upon a larger scale the operating cams and the web holders. I have, in said figure, as well as in Fig. 10, represented the stationary cam 102 for moving the web holders outwardly or for controlling or limiting their inward movement, and it will be observed that said cam 102 has a shoulder 103 extending outwardly to a very slightly greater extent than the immediately preceding portion of the edge 104. The purpose of this very slight shoulder is very slightly to withdraw the special web holders at this point, to prevent undue strain upon the backing yarn which, at this point, is being moved by the special web holders from the back of the fabric to the front face.

In Figs. 29 and 30, I have indicated more in detail the feeding of the yarns. Therein at 105 I have represented the yarn finger for feeding the white yarn and at 106 the yarn finger for feeding the red yarn. It will be observed that the white yarn is fed without tension and that the red yarn is tensioned by the discs 107, 108, a coiled spring 109 being employed to press the disc 107 with light but sufficient pressure against the stationary disc 108. It will also be observed that the red yarn, which in normal plating appears at the front or outer face of the fabric, is introduced slightly in advance, circumferentially of the white yarn. The tension upon the red yarn is maintained at all times, whether normal or reverse plating is being effected.

Referring to Figs. 25 to 28ª, it is noted that I have, in Figs. 25 and 26, indicated seven different positions of the needle and web holder adjacent thereto in the forming of a stitch, Fig. 25 representing the use of one of the special web holders and the consequent formation of a reverse plating loop, and Fig. 26 representing the use of a regular web holder and hence the production of a normal plating loop.

It will be understood that, in plating, the yarn to the front of the needle is the one which appears on the back (inside) of the finished stocking. In normal plating this is the yarn which is without tension, and the other yarn, which is under tension, appears upon the outside or face of the finished stocking.

In normal plating the front yarn under tension (see Figs. 29 and 30) strikes the needles more quickly and lower down on the stems thereof than the backing yarn, but the backing yarn first engages the needles higher up and, it may be, in the hooks thereof. The said front yarn, as, for example, red, will get up into the hook of each needle last and will act as a wedge to force the backing yarn toward the front of the hook of the needle.

In reverse plating, there is no change in the tension of the yarn (red, for example) and the other yarn is still permitted to be fed without tension, but the nose of the special web holder entering between the two yarns (as shown in positions C and D, Fig. 25) instead of under both yarns, as in positions C′ and D′ of Fig. 26 in normal plating, causes a reversal in the position of the two yarns, as has already been explained. This is also evident from a comparison of Figs. 28 and 28ª.

That is to say, in normal plating the facing yarn (red, for example, in Fig. 26) wedges the white yarn to the front of the hook (as shown in positions E′ and F′), but in reverse plating the facing yarn (red, for example, in Fig. 25) is not permitted, by reason of the entrance of the nose of the special web holder, to wedge the backing yarn (white, for example) to the front of the hook, but said backing yarn is itself forced toward the back of the hook (see position D in Fig. 25) by the nose of the special web holder and the front (red) yarn rises to a position at the front of the hook (positions E and F).

In carrying out my invention in practice I prefer to employ latch needles, but I may use spring beard needles. If I use latch needles I may use throughout needles which are identical so far as the hooks are concerned.

Referring to any stripe as made by me by reverse plating, at its beginning or first edge of the stripe (that is, where the special sinkers for that stripe begin), I can make a perfect line of demarcation without any differentiation in the hooks of the needles, but at the other or terminating edge of the stripe a very slight differentiation between the needles tends to help the yarn revert itself back to its normal plating order or position, at high speeds. At slow speeds no differentiation is needed and with coarse gages little or no differentiation is needed.

For the reason stated I prefer, for work at high speeds and in fine gages, to use a standard forward hook needle at the beginning of the normal plating stripe and a standard centre hook needle at the ending edge of the reverse plating stripe. Inasmuch as under such conditions I prefer to use a standard forward hook needle and a standard centre hook needle, I in practice use standard centre hook needles throughout the entire extent of each and every normal plating stripe. Those two types of needles are shown respectively as Figs. 27[a], 28[a], 27 and 28. That is to say, in Figs. 26[a], 27[a], 28[a], I have shown at 109 a standard forward hook needle, and in Figs. 25[a], 27 and 28 I have shown at 110 a standard centre hook needle. Both these needles have been standard upon the market for many years. As will be noted, the front hook (Figs. 27[a], 28[a]) is offset about one third the diameter of the hook.

In the use of such differentiated needles, and particularly at the outgoing edge of a reverse plating stripe, the facing yarn in the forward hooks gets into the back part of the hooks and wedges the backing yarn to the front of said needle hooks, but at the centre hooks (in the reverse plating), the said facing yarn gets to the front of the hooks and the backing yarn gets to the back part of the hooks. If it were attempted to perform reverse plating wholly by differentiated needle hooks, and not to employ special sinkers, as herein described, it would be practically impossible to make a reverse plated stripe of more than one or two needles in width (in coarse gages one needle and in fine gages perhaps three or four needles) unless the needles be successively offset more and more, which is impracticable; also for different gages it would be necessary to offset differently. This would require a different needle every time the stripe is changed.

In the practice of my invention I can make the reverse plating stripe of any width (or have none) and can and do work with narrow or fine gage.

I might at the outgoing edge of each reverse plated stripe bend the last needle in the stripe inwardly and the first needle next beyond the stripe (that is, the next needle) I could bend outwardly. I prefer, however, for reasons stated, to use the two types of needles, but, in and of themselves, the difference in hooks is not enough to make a reverse plating stripe.

The type of knitting machine herein disclosed, and to which my invention particularly relates, is a direct thread measuring machine.—i. e., one wherein the length of needle loops is controlled by the thread drawing movement of the needles.

I do not herein claim that more specific embodiment of my broad invention disclosed in my copending application Serial No. 149,952, filed November 22, 1926.

This invention comprehends within its scope, but I do not herein disclose or specifically claim that form of my broad invention which is disclosed and claimed in my copending application, Serial No. 149,952.

Having thus described one embodiment of the mechanism of the invention for producing the article or fabric of this invention and having described certain types of that article or fabric, and also the best mode known to me for carrying out the process of my invention, I desire it to be understood that although specific terms are employed, they are used in a generic and descriptive sense and not for purposes of limitation, the scope of the invention being set forth in the following claims.

Claims:

1. That process of producing lengthwise stripes in plating knitting, comprising feeding two yarns in a plating relation to a series of needles and knitting them in said relation at certain wales to produce normal plating, and at other predetermined wales causing a separate instrumentality for each of said other predetermined wales to move transversely of and between adjacent needles of said wales, and thereby to enter between and separate the said two yarns and to move the backing yarn into a position where it will appear at the face of the fabric, thereby producing reverse plating at said other predetermined wales.

2. That process of producing lengthwise stripes in plating knitting upon a series of independent needles comprising feeding two yarns in a plating relation to said series of independent needles and knitting them in said relation at certain wales to produce normal plating, and at other predetermined wales causing a separate independently movable instrumentality for each of said other predetermined wales, to move transversely of and between adjacent needles of said wales and thereby to enter between and separate the said two yarns and to move the backing yarn into a position where it will appear at the face of the fabric, thereby producing reverse plating at said other predetermined wales.

3. That process of producing lengthwise stripes in plating knitting comprising feeding two yarns in a plating relation to a series of needles with one of said yarns under greater tension than the other and knitting them in said relation at certain wales to produce normal plating, and at other predetermined wales causing a separate instrumentality for each of said other predetermined wales to move transversely of and between adjacent needles of such wales, without altering the relative tension relation of said two yarns, and thereby to enter between and separate the said two yarns and to move the backing yarn into position where it will appear at the face of the fabric, thereby producing reverse plating at said other predetermined wales.

4. That process of producing lengthwise stripes in plating knitting, comprising feeding two yarns in a plating relation to a series of needles and knitting them in said relation at certain wales to produce normal plating, and at other predetermined wales causing a separate instrumentality for each of said other predetermined wales to move transversely of and between adjacent needles of said wales and thereby to enter between and separate the said two yarns and to push the backing yarn into a position where it will appear at the face of the fabric, thereby producing reverse plating at said other predetermined wales.

5. That process of producing lengthwise stripes in plating knitting upon a circular series of independent knitting needles in a machine having a corresponding series of radially moving web holders, comprising feeding two yarns in a plating relation to said series of needles and knitting them in said relation at predetermined wales to produce normal plating, and at other predetermined wales causing the web holders pertaining to said other predetermined wales to move inward transversely of the needle circle and in so moving to engage the backing yarn and to push the same only, into a position where, when the loop formation by the needles is completed, it will appear at the face of the fabric, thereby producing reverse plating at said other predetermined wales.

6. That process of producing lengthwise stripes in plating knitting upon a circular series of independent knitting needles in a machine having a corresponding series of radially moving web holders, comprising feeding two yarns in a plating relation to said series of needles and knitting them in said relation at predetermined wales to produce normal plating, and at other predetermined wales causing the web holders pertaining to said other predetermined wales to move inward and in so moving to enter a formation thereof between said two yarns, thereby to separate the same and to push the separated backing yarn into a position where, when the loop formation by the needles is completed, it will appear at the face of the fabric, thereby producing reverse plating at said other predetermined wales.

7. That process of producing lengthwise stripes in plating knitting upon a circular series of independent knitting needles in a machine having a corresponding series of in and out movable web holders, comprising feeding two yarns in a plating relation to said series of needles and knitting them in said relation at certain wales to produce normal plating, and at other predetermined wales causing the web holders pertaining to said other predetermined wales to move transversely of the needles and in so moving to engage the backing yarn and to move the same only, into a position where, when the loop formation by the needles is completed, it will appear at the face of the fabric, thereby producing reverse plating at said other predetermined wales.

8. In an independent needle knitting mechanism for producing lengthwise striped, plated, knitted fabric, wherein two yarns are fed in plating relation and wherein a web holder is employed for each needle, a special instrumentality for use in such mechanism and adapted for insertion between desired adjacent needles and of transverse movement relative thereto and having a head provided with an edge positioned to separate the two plating yarns, and upon such transverse movement to push the backing yarn into a position to become the face yarn of the stripe.

9. In an independent needle knitting mechanism for producing lengthwise striped, plated, knitted fabric, wherein two yarns are fed in plating relation and wherein a web holder is employed for each needle, a special instrumentality for use in such mechanism and adapted for insertion between desired adjacent needles and of transverse movement relative thereto, and having a head provided with an upwardly and rearwardly extending sloping edge positioned to separate the two plating yarns, and upon such transverse movement to push the backing yarn into a position to become the face yarn of the stripe.

10. In an independent needle knitting mechanism for producing lengthwise striped, plated, knitted fabric, wherein two yarns are fed in plating relation and wherein a web holder is employed for each needle, a special instrumentality for use in such mechanism and adapted for insertion between desired adjacent needles and for in and out movement relative thereto and having a head provided with an edge positioned to enter between the backing yarn and the face yarn and thereby to separate the same and upon continued movement to move the said backing yarn into a position to become the face yarn of the stripe, thereby effecting reverse plating.

11. In an independent needle knitting mechanism for producing lengthwise striped, plated, knitted fabric, wherein two yarns are fed in plating relation and wherein a web holder is employed for each needle, a special instrumentality for use in such mechanism and adapted for insertion between desired adjacent needles and transverse movement relative thereto, and having a head provided with an upwardly and rearwardly extending sloping edge positioned to enter between the backing yarn and the face yarn and thereby to separate the same and upon continued movement to move the said backing yarn into a position to become the face yarn of the stripe, thereby effecting reverse plating.

12. Mechanism for producing lengthwise striped plated knitted fabric comprising in combination; a series of independent needles, means to feed two yarns thereto in plating relation, and web holders for each of said needles, including special web holders for the needles whereon reverse or lengthwise striped, plated fabric is produced, said special web holders having formations to enter between the normal backing yarn and normal face yarn and push the said normal backing yarn, thereby to bring it into a position to become the face yarn at said lengthwise stripes only.

13. Mechanism for producing lengthwise striped plated knitted fabric comprising in combination, a series of independent needles acting to draw or measure the loops upon downward movement, means to feed two yarns thereto in plating relation and web holders for each of said needles, including special web holders for the needles whereon reverse or lengthwise striped plated fabric is produced, said special web holders having formations to separate the normal backing yarn from the normal face yarn and to move the said normal backing yarn so separated into a position to become, when the loop drawing movement of the needles is completed, the face yarn at said lengthwise stripes only.

14. Mechanism for producing lengthwise striped plated knitted fabric comprising in combination, a series of independent needles, means to feed two yarns thereto in plating relation, and web holders for each of said needles, including special web holders for the needles whereon reverse or lengthwise striped plated fabric is produced, said special web holders having formations to engage the normal backing yarn and push the same only into a position to become the face yarn at said lengthwise stripes only, and means to project the special web holders transversely inward at an earlier period relatively than the remaining web holders, for said engagement with the backing yarn.

15. Mechanism for producing lengthwise striped, plated, knitted fabric comprising in combination; a series of independent needles, means to feed two yarns thereto in plating relation, and web holders for each of said needles, including special web holders for the needles whereon reverse or lengthwise striped, plated fabric is produced, said special web holders having formations to engage the normal backing yarn and push the same only into a position to become the face yarn at said lengthwise stripes only, and means for controlling said special web holders so that they may act either as regular or as special web holders.

16. Mechanism for producing lengthwise striped, plated knitted fabric comprising in combination; a series of independent needles, means to feed two yarns thereto in plating relation, and web holders for each of said needles, including special web holders for the needles whereon reverse or lengthwise striped, plated fabric is produced, said special web holders having formations to engage the normal backing yarn and push the same only into a position to become the face yarn at said lengthwise stripes only, a cam for acting upon all of said web holders to move them inward and an additional cam to act only upon said special web holders and to move them inward at predetermined times.

17. Mechanism for producing lengthwise striped, plated, knitted fabric comprising in combination; a series of independent needles, means to feed two yarns thereto in plating relation, and web holders for each of said needles, including special web holders for the needles whereon reverse or lengthwise striped, plated fabric is produced, said special web holders having formations to engage the normal backing yarn and push the same only into a position to become the face yarn at said lengthwise stripes only, a cam for acting upon all of said web holders to move them inward for normal plating, and an additional cam to act only upon said special web holders and to move them inward in effecting reverse or striped plating, and means to control the position of said additional cam.

18. Mechanism for producing lengthwise striped, plated, knitted fabric comprising in combination, a series of independent needles, means to feed two yarns thereto in plating relation, and web holders for each of said needles, including two sets of special web holders for the needles whereon reverse or lengthwise striped, plated fabric is produced, said two sets of special web holders having contrasting butt formations and also having formations to engage the normal backing yarn, thus separating the two yarns, and push the same into a position to become the face yarn at said lengthwise stripes only.

19. Mechanism for producing lengthwise striped, plated, knitted fabric comprising in combination; a series of independent needles, means to feed two yarns thereto in plating relation, and web holders for each of said needles, including two sets of special web holders for the needles whereon reverse or lengthwise striped, plated fabric is produced, said two sets of special web holders having contrasting butt formations and also having formations to engage the normal backing yarn, thus separating the two yarns and pushing the same into a position to become the face yarn at said lengthwise stripes only, and means to project the special web holders inward, at an earlier period relatively than the remaining web holders for said engagement with the backing yarn.

20. Mechanism for producing lengthwise striped, plated, knitted fabric comprising in combination; a series of independent needles, means to feed two yarns thereto in plating relation, and web holders for each of said needles, including two sets of special web holders for the needles whereon reverse or lengthwise striped plated fabric is produced, said two sets of special web holders having contrasting butt formations and also having formations to engage the normal backing yarn, thus separating the two yarns, and push the same into a position to become the face yarn at said lengthwise stripes only, and means for controlling said special web holders so that they may act either as regular or special web holders.

21. Mechanism for producing lengthwise striped, plated, knitted fabric comprising in combination; a series of independent needles, means to feed two yarns thereto in plating relation, and web holders for each of said needles including two sets of special web holders for the needles whereon reverse or lengthwise striped, plated fabric is produced, said two sets of special web holders having contrasting butt formations and also having formations to engage the normal backing yarn, thus separating the two yarns, and push the same into a position to become the face yarn at said lengthwise stripes only; a cam for acting upon all of said web holders to move them inward, and two additional cams to act respectively upon said special web holders and to move them inward at predetermined times.

22. Mechanism for producing lengthwise striped, plated, knitted fabric comprising in combination, a series of independent needles, means to feed two yarns thereto in a plating relation and instrumentalities distinct from the needles and inserted between adjacent needles, such instrumentalities each having a head provided with an edge positioned to separate the normal backing yarn from the normal plating yarn, and upon movement transverse to the needles to push the said backing yarn into a position to become, when the loop formation by the needles is completed, the facing yarn of the stripe, and means to impart such transverse movement to said instrumentalities.

23. Mechanism for producing lengthwise striped, plated, knitted fabric comprising in combination; a series of independent needles acting to draw or measure the loops upon downward movement, means to feed two yarns thereto in plating relation, and web holders for each of said needles, including special web holders for the needles whereon reverse or lengthwise striped, plated fabric is produced, said special web holders having formations to separate the normal backing yarn and the normal face yarn and to push said normal backing yarn into a position to become, when the loop drawing movement of the needles is completed, the face yarn at said lengthwise stripes only.

24. Mechanism for producing lengthwise striped, plated, knitted fabric comprising in combination; a series of independent needles acting to draw or measure the loops upon downward movement, means to feed two yarns thereto in plating relation, and web holders for each of said needles, including special web holders for the needles whereon reverse or lengthwise striped, plated fabric is produced, said special web holders having formations to enter between the normal backing yarn and the normal face yarn and thereby separate the same and move the normal backing yarn into a position to become, when the loop drawing movement of the needles is completed, the face yarn at said lengthwise stripes only.

25. That process of producing lengthwise stripes in plating knitting upon a circular series of knitting needles in a machine having a corresponding series of in and out movable web holders, comprising feeding two yarns in a plating relation to said series of needles and knitting them in said relation at predetermined wales to produce normal plating, and at other predetermined wales causing the web holders pertaining to said other predetermined wales to move inward and in so moving to engage the backing yarn and to move the same only, into a position where, when the loop formation by the needles is completed, it will appear at the face of the fabric, thereby producing reverse plating at said predetermined wales.

26. That process of producing lengthwise stripes in plating knitting upon a series of independent knitting needles in a machine having a corresponding series of transversely movable web holders, comprising feeding two yarns in a plating relation to said series of needles and knitting them in said relation at predetermined wales to produce normal plating, and at other predetermined wales causing said web holders pertaining to said other predetermined wales to move transversely between the needles, and in so moving to separate the two yarns and move the backing yarn into a position where, when the loop formation by the needles is completed, it will appear at the face of the fabrice, thereby producing reverse plating at said other predetermined wales.

27. Mechanism for producing lengthwise striped, plated, knitted fabric comprising in combination, a series of independent needles, means to feed two yarns thereto in plating relation and web holders for each of said needles including special web holders for the needles whereon reverse or lengthwise striped, plated fabric is produced, said special web holders each having a formation to separate the two yarns and move the backing yarn into a position where, when the loop formation by the needles is completed, it will appear at the face of the fabric, thereby producing reverse plating at said other predetermined wales.

28. A circular knitting machine for producing lengthwise plated, knitted fabric comprising in combination, a circular series of independent needles, means to feed yarn thereto in plating relation, and web holders for each of said needles movable in and out therebetween, including special web holders for the needles whereon reverse or lengthwise striped, plated fabric is produced, said special web holders each having a formation to engage the backing yarn upon its forward movement and to push the same only, upon said inward movement, into a position, when the loop formation by the needles is completed, to become the face yarn of said lengthwise stripes only.

29. That improvement in the process of forming stripes in knitting plated fabrics, which consists in feeding a back thread and a face thread in a plating relation to a series of needles, causing said needles to draw said threads over a series of web holders, which are relatively movable transversely of the needles, and thereby form loops in the threads with said face thread normally at the face of the fabric, and reversing the said threads at certain of the web holders by causing the latter web holders to effect thread engagement at an abnormally early point in the loop forming operation by said relative movement transversely of the needles.

30. Mechanism for effecting plating and reverse plating in a knitted fabric including a series of independent needles, thread engaging instrumentalities for each needle respectively and including special instrumentalities where reverse plating is to be formed, said instrumentalities being movable individually transversely of the needle series, thread guiding means to feed a back thread and a face thread in plating relation to the needles, and means governing the transverse movement of said special instrumentalities and acting thereon at an abnormally early point in the loop forming operation to effect a relative transverse movement of at least one of said threads with respect to the needles with consequent reversal in position of said threads, whereby, when loop formation by the needles is respectively completed, the back thread will appear at the face of the fabric.

31. Mechanism for effecting plating and reverse plating in a knitted fabric including a series of independent needles, thread engaging instrumentalities for each needle respectively, and including special instrumentalities where reverse plating is to be formed, said instrumentalities being movable individually transversely of the needle series, thread guiding means to feed a back thread and a face thread in plating relation to the needles, and means governing the transverse movement of said special instrumentalities to cause them to act at an earlier point than the other thread engaging instrumentalities, thereby to move at least one of said threads transversely with respect to the needle series, so as, when loop formation by the needles is completed, the back thread will appear at the face of the fabric.

32. Mechanism for effecting plating and reverse plating in a knitted fabric including a series of independent needles, thread engaging instrumentalities for each needle respectively and including special instrumentalities where reverse plating is to be formed, said instrumentalities being movable individually transversely of the needle series, thread guiding means to feed a back thread and a face thread in plating relation to the needles, and means for moving said special instrumentalities transversely of the needle series at an earlier point than the other thread engaging instrumentalities, thereby to reverse the relative position of the face and back threads, whereby, when loop formation at the needles pertaining to said thread engaging instrumentality is respectively completed, the back thread will there appear at the face of the fabric.

33. A circular knitting machine for plating and reverse plating in a knitted fabric including a circular series of independent needles, thread engaging instrumentalities between the needles respectively and including special instrumentalities where reverse plating is to be formed, and individually movable in and out, thread guiding means to feed a back thread and a face thread in plating relation to the needles, and means cooperating with said special thread engaging instrumentalities, governing their in and out movement and acting at an earlier point circumferentially considered, than the other thread engaging instrumentalities, to move at least one of said threads radially with respect to the needles, so as to reverse their position, whereby when loop formation by the needles is respectively completed, the back thread will appear at the face of the fabric.

34. A direct thread measuring, knitting machine, i. e., one wherein the length of needle loops is controlled by the thread drawing movement of the needles, having a series of needles, means for supplying two threads in a plating relation to said series of needles, thread engaging instrumentalities between the needles respectively and individually movable transversely of the needle series, and means to move certain of said thread engaging instrumentalities transversely of the needle series at an abnormally early point in the loop forming operation for effecting thread reversal at the needles corresponding to said certain thread engaging instrumentalities so as, when loop formation by the needles is respectively completed, the back thread will appear at the face of the fabric.

35. A circular knitting machine for effecting plating and reverse plating in a knitted fabric including a circular series of independent needles carried by a rotating member, thread engaging instrumentalities between the needles respectively and individually movable in and out, thread guiding means to feed a back thread and a face thread in plating relation to the needles, and means to move certain of said thread engaging instrumentalities radially inward at an earlier point circumferentially considered than the other thread engaging instrumentalities so as by thread engagement to effect, when loop formation by the needles is completed, a change from normal plating to reverse plating.

36. That process of effecting striped plating in knitted fabrics consisting in feeding a back thread and a face thread to the needles so as to effect normal plating, moving certain thread engaging instrumentalities trasversely to the needle series at an abnormally early point in the loop forming operation, so as to effect thread engagement in such manner as to cause relative change in the position of the two threads, whereby, when loop formation by the needles is completed, reverse plating is produced at the wales pertaining to said certain thread engaging instrumentalities.

37. Mechanism for producing lengthwise striped plated knitted fabric, comprising in combination; a series of independent needles, means to feed two yarns thereto in plating relation, and web holders for each of said needles including special web holders for the needles whereon reverse or lengthwise striped plated fabric is produced, said special web holders having yarn engaging formations, and means to move said special web holders transversely of the needle series at an abnormally early point in the loop forming operation, thereby to effect reverse plating, i. e., to cause the normal back yarn to appear at the face of the fabric when the loop formation by the needles is completed.

38. Mechanism for producing lengthwise striped, plated, knitted fabric comprising in combination, a series of independent needles, means to feed two yarns thereto in plating relation, and web holders for each of said needles including a plurality of sets of special web holders for the needles whereon reverse or lengthwise striped, plated fabric is produced, said plurality of sets of web holders having contrasting butt formations and also having yarn engaging formations, and means to project the special web holders transversely of the needle series at an earlier period relatively than the remaining web holders, thereby to effect reverse plating, i. e., to cause the normal back yarn, when loop formation by the needles is completed, to appear at the face of the fabric.

39. Mechanism for producing lengthwise striped, plated, knitted fabric comprising in combination; a circular series of independent needles, means to feed two yarns thereto in plating relation, and web holders for each of said needles, including a plurality of sets of special web holders for the needles whereon reverse or lengthwise striped plated fabric is produced, said plurality of sets of special web holders having contrasting butt formations and also having yarn engaging formations, and a corresponding plurality of special cams cooperating respectively with the contrasting butt formations and positioned to project corresponding special web holders radially inward at an earlier point relatively than the remaining web holders, thereby to effect reverse plating, i. e., to cause the normal back yarn, when loop formation by the needles is completed, to appear at the face of the fabric.

40. Mechanism for producing lengthwise striped plated knitted fabric comprising in combination, a circular series of independent needles, means to feed two yarns thereto in plating relation and web holders for each of said needles including a plurality of sets of special web holders for the needles whereon reverse or lengthwise striped plated fabric is produced, said plurality of sets of special web holders having contrasting butt formations, and also having yarn engaging formations and pattern controlled cam means to engage special web holders according to their contrasting butt formations, and, according to pattern control, to project such special web holders radially inward at an earlier point relatively than the regular web holders, thereby to effect reverse plating, i. e., to cause the normal back yarn, when loop formation by the needles is completed, to appear at the face of the fabric.

41. Mechanism for producing lengthwise striped, plated, knitted fabric comprising in combination; a circular series of independent needles, means to feed a face thread and a normal back thread thereto in plating relation, and web holders for each of said needles including special web holders for the needles whereon reverse or lengthwise striped plated knitted fabric is produced, and means to move said special web holders radially inward at an earlier period relatively than the remaining web holders to effect reverse plating, i. e., the appearance, when loop formation by the needles is completed, of the normal back thread at the face of the fabric.

42. That improvement in the process of forming stripes in knitting plated fabrics, which consists in feeding a back thread and a face thread in a plating relation to a series of needles, providing a series of web holders for the needles respectively and including a plurality of sets of special web holders, which sets as between themselves have contrasting formations by which they are selected for operation, said special web holders being relatively movable transversely of the needles, causing said needles to draw said threads over said series of web holders and thereby form loops in said threads with said face thread normally at the face of the fabric, and reversing the said threads at said plurality of sets of special web holders by causing said special web holders according to their contrasting group formations to be moved relatively transversely of the needles to effect thread engagement at an abnormally early point in the loop forming operation.

43. In a circular independent needle knitting machine, a circular series of independent needles, operating means therefor, means to feed two threads into knitting engagement with the needles in a normal plating relation, thread engaging instrumentalities individually movable in and out between adjacent needles and adapted by reason of relative movement of said instrumentalities and the cooperating needles to produce reverse plating at corresponding wales when loop formation by the said needles is completed, and cam means controlling the said in and out movements of said instrumentalities whereby through said controlled movements said instrumentalities function either as regular web holders to effect normal plating or as special instrumentalities to effect said reverse plating.

44. In a knitting machine, a series of independent needles and operating means therefor, means to feed two threads into knitting engagement with said needles in a normal plating relation, thread-engaging instrumentalities individually movable transversely of and between the needles and including regular web holders or sinkers, and also including special instrumentalities, which latter, by relative movement thereof and the adjacent co-operating needles, effect reverse plating, and means controlling the said transverse movement of said instrumentalities whereby said special instrumentalities are caused to cooperate either to effect reverse plating or to effect normal plating at said cooperating needles.

45. In a knitting machine, a series of independent needles and operating means therefor, means to feed two threads into knitting engagement with said needles in a normal plating relation, thread-engaging instrumentalities individually movable transversely of and between the needles and including regular web holders or sinkers, and also including special instrumentalities, which latter, by relative movement thereof and the adjacent co-operating needles, effect reverse plating, and means acting automatically to cause said special instrumentalities to function either in effecting reverse plating or in effecting normal plating by controlling the said transverse movement of said instrumentalities.

46. A circular knitting machine for effecting plating and reverse plating in a knitted fabric including a circular series of independent needles, thread engaging instrumentalities between the needles respectively and individually movable in and out, and including instrumentalities having a web holding function and special thread engaging instrumentalities individually movable in and out, thread guiding means distinct and separate from all said instrumentalities and adapted to feed a back thread and a face thread in plating relation to and into knitting engagement with the needles, and means governing the in and out movement of said thread engaging instrumentalities to effect change from plating to reverse plating through thread engagement of said special instrumentalities during needle movement for drawing or forming the stitch.

In witness whereof, I have signed my name to this specification.

ROBERT H. LAWSON.

DISCLAIMER

Reissue No. 16,584.—*Robert H. Lawson,* Pawtucket, R. I. REVERSE PLATING BY ACTION OF CASTING-OFF MECHANISM. Reissue patent dated April 5, 1927. Disclaimer filed December 27, 1930, by the patentee, said *Lawson*, assignee, *Hemphill Company*, concurring.

Disclaims any meaning given to or attempted or sought in any way to be put upon or given to said claims 1, 2, and 4, covering or predicated upon or including, by a separate instrumentality at any predetermined wale, a yarn separating movement for reverse plating, if said separating movement be directly effected lengthwise only of the needles, instead of transversely thereof, even though each instrumentality that by said movement lengthwise the needles, thereby separating the yarns, also has elsewhere in its cycle a movement transversely of the needles, (but said transverse movement being for yarn sinking or measuring and not directly effecting the yarn separation), since the disclaimed meaning is disclosed in and is properly predicated upon the patent to Terrot, No. 467,330, January 19, 1892, whereas the movement transversely of and between adjacent needles, called for in said claims 1, 2, and 4, occurs during and itself directly causes the separating movement, as clearly set forth in the specification of my said patents.

[*Official Gazette January 13, 1931.*]